United States Patent
Shibata

(10) Patent No.: US 11,954,343 B2
(45) Date of Patent: Apr. 9, 2024

(54) APPARATUS, DATA TRANSFER SYSTEM, AND DATA TRANSFER METHOD

(71) Applicant: Yusuke Shibata, Tokyo (JP)

(72) Inventor: Yusuke Shibata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 107 days.

(21) Appl. No.: 17/305,100

(22) Filed: Jun. 30, 2021

(65) Prior Publication Data

US 2022/0155984 A1 May 19, 2022

(30) Foreign Application Priority Data

Nov. 17, 2020 (JP) .............................. 2020-191125

(51) Int. Cl.
*G06F 3/06* (2006.01)
*G06Q 10/107* (2023.01)

(52) U.S. Cl.
CPC .......... *G06F 3/0635* (2013.01); *G06F 3/0604* (2013.01); *G06F 3/0622* (2013.01); *G06F 3/0659* (2013.01); *G06F 3/067* (2013.01); *G06Q 10/107* (2013.01)

(58) Field of Classification Search
CPC .... G06F 3/0635; G06F 3/0604; G06F 3/0622; G06F 3/0659; G06F 3/067; G06Q 10/107
See application file for complete search history.

(56) References Cited

U.S. PATENT DOCUMENTS

| | | | |
|---|---|---|---|
| 6,256,115 B1* | 7/2001 | Adler ................. | H04N 1/32406 358/442 |
| 10,310,760 B1* | 6/2019 | Dreier ................... | G06F 13/42 |
| 2005/0190404 A1* | 9/2005 | Nakamura ......... | H04N 1/00212 379/100.09 |
| 2007/0279698 A1* | 12/2007 | Ichiki ................. | H04N 1/00209 358/400 |
| 2013/0163042 A1* | 6/2013 | Sasano .................. | G06F 3/1296 358/1.15 |
| 2014/0344445 A1* | 11/2014 | Lee ..................... | H04L 43/0876 709/224 |
| 2016/0328796 A1* | 11/2016 | Acuña-Rohter ....... | G06Q 40/04 |

(Continued)

FOREIGN PATENT DOCUMENTS

| | | |
|---|---|---|
| JP | 2010-081056 | 4/2010 |
| JP | 2018-042067 | 3/2018 |
| JP | 2019-041153 | 3/2019 |

OTHER PUBLICATIONS

Tebbs, Robert G. "Real-time IP facsimile: Protocol and gateway requirements." Bell Labs technical journal 4.2 (1999): 128-145. (Year: 1999).*

(Continued)

*Primary Examiner* — Nicholas J Simonetti
(74) *Attorney, Agent, or Firm* — IPUSA, PLLC

(57) ABSTRACT

An apparatus, system, and method are provided each of which stores data that is received in a memory; acquires transfer history information indicating a transfer state of the data, from an information processing system configured to transfer the data to an external storage; identifies data to be transmitted from within the data stored in the memory, based on the transfer history information; and transmits the identified data to the information processing system.

19 Claims, 33 Drawing Sheets

(56) References Cited

U.S. PATENT DOCUMENTS

2021/0109691 A1* 4/2021 Yamakawa ........... G06F 3/1236
2021/0224292 A1* 7/2021 Hirose .................. G06F 16/275

OTHER PUBLICATIONS

Bodson, Delta Information Systems Inc Horsham PA. Error Control Option for Group 3 Facsimile Equipment. 1987. (Year: 1987).*
Toyoda, Kiyoshi, Shiro Tamoto, and David H. Crocker. "Internet facsimile as an Internet office appliance." IEEE Communications Magazine 39.10 (2001): 60-66. (Year: 2001).*

* cited by examiner

| TRANSMISSION SOURCE NUMBER | SORT-DESTINATION FOLDER NAME | EMAIL ADDRESS TO BE NOTIFIED |
|---|---|---|
| 0312345678 | ABC | aaa@aaa.com |
| 0311112222 | DEF | bbb@aaa.com |
| 0987654321 | XXX | ccc@aaa.com |
| ⋮ | ⋮ | ⋮ |

? ✱ AAA ▼

Back To Top/Back To App Manager

▦ Fax-Cloud Coordination

Asterisk (✱) indicates required field
Storage Settings

| | | |
|---|---|---|
| Storage | XXX Cloud 309 | |
| Storage Account✱ | [ Select User ] | No user is selected. |
| Save Fax to✱ | [ Select Folder ] —310 | No folder is selected. |
| Sort Definition Table File✱ | [ Select File ] | No file is selected. |

Settings for Undefined Fax       311            312

| | |
|---|---|
| Folder Name for Undefined Fax Storage✱ | [ Fax Receive Tray ] |
| Email Address to Be Notified For Undefined Fax (If not designated, no notification will be sent) | [ + ]  [                314                ] 313 |
| Email Address to Be Notified in Case of Error✱ | [                                    ]  Email address to be notified in case of error has not been entered. |

| FACSIMILE DATA ID | TRANSMISSION SOURCE NUMBER | RECEPTION TIME |
|---|---|---|
| 0000001 | 0312345678 | 2019-12-20-T11:22:33+09:00 |
| 0000002 | 0311112222 | 2019-12-20-T12:05:51+09:00 |
| 0000003 | 0987654321 | 2019-12-21-T19:05:02+09:00 |
| ⋮ | ⋮ | ⋮ |

FIG. 17

```
From: no_reply@xxx.com
To: aaa@aaa.com
Cc:
Title: [Smart Fax Sorting] Fax from 0312345678(No.1234)

A fax sent to you has been received. Please check from the following link.

ABC_20190213_143342.pdf
https://cloudstrageAAA.com/Documents/top/ABC/ABC_20190213_143342.pdf
```

```
From: no_reply@xxx.com
To: aaa@aaa.com
Cc:
Title: [Smart Fax Sorting] Fax from 0312345678(No.1234)

A fax sent to you has been received. Please check from the following link.

0312345678_20190213_143342.pdf
https://cloudstrageAAA.com/Documents/top/undefined/0312345678_20190213_143342.pdf
```

| QUEUE ID | PROCESS | FACSIMILE DATA ID |
|---|---|---|
| Q0001 | DATA TRANSFER PROCESS | 0000001 |
| Q0002 | RETRANSMISSION PROCESS | – |
| Q0003 | DATA TRANSFER PROCESS | 0000002 |
| Q0004 | DATA TRANSFER PROCESS | 0000003 |

| JOB ID | MACHINE IDENTIFICATION NUMBER | FACSIMILE DATA ID | TRANSFER STATUS |
|---|---|---|---|
| J0001 | 3A10-115500 | 0000001 | ERROR |
| J0002 | 3A10-115500 | 0000001 | COMPLETED |
| J0003 | 3A10-115500 | 0000002 | COMPLETED |
| J0004 | 3A10-115555 | 0000001 | COMPLETED |
| J0005 | 3A10-115500 | 0000003 | COMPLETED |
| J0006 | 3A10-115500 | 0000004 | COMPLETED |
| J0007 | 3A10-115500 | 0000005 | COMPLETED |
| J0008 | 3A10-115500 | 0000006 | COMPLETED |
| J0009 | 3A10-115500 | 0000007 | COMPLETED |
| J0010 | 3A10-115500 | 0000008 | COMPLETED |
| J0011 | 3A10-115500 | 0000009 | ERROR |
| J0012 | 3A10-115500 | 0000010 | PROCESSING |
| J0013 | 3A10-115500 | 0000011 | PROCESSING |
| J0014 | 3A10-115500 | 0000012 | ERROR |
| J0015 | 3A10-115500 | 0000013 | PROCESSING |
| J0016 | 3A10-115500 | 0000014 | ACCEPTED |
| J0017 | 3A10-115555 | 0000002 | PROCESSING |
| J0018 | 3A10-115588 | 0000001 | ACCEPTED |

FIG. 22

| MACHINE IDENTIFICATION NUMBER | FACSIMILE DATA ID | TRANSFER STATUS |
|---|---|---|
| 3A10-115500 | 0000001 | COMPLETED |
| 3A10-115500 | 0000002 | COMPLETED |
| 3A10-115500 | 0000003 | COMPLETED |
| 3A10-115500 | 0000004 | COMPLETED |
| 3A10-115500 | 0000005 | COMPLETED |
| 3A10-115500 | 0000006 | COMPLETED |
| 3A10-115500 | 0000007 | COMPLETED |
| 3A10-115500 | 0000008 | COMPLETED |
| 3A10-115500 | 0000010 | COMPLETED |
| 3A10-115500 | 0000011 | PROCESSING |
| 3A10-115500 | 0000013 | PROCESSING |
| 3A10-115500 | 0000014 | ACCEPTED |

FIG. 24

| MACHINE IDENTIFICATION NUMBER | FACSIMILE DATA ID |
|---|---|
| 3A10-115500 | 0000009 |
| 3A10-115500 | 0000012 |
| 3A10-115500 | 0000015 |
| 3A10-115500 | 0000016 |

| QUEUE ID | PROCESS | FACSIMILE DATA ID |
|---|---|---|
| Q0001 | DATA TRANSFER PROCESS | 0000001 |
| Q0002 | RETRANSMISSION PROCESS | – |
| Q0003 | DATA TRANSFER PROCESS | 0000002 |
| Q0004 | DATA TRANSFER PROCESS | 0000003 |
| Q0005 | DATA DELETION PROCESS | – |

FIG. 28

| FACSIMILE DATA ID | TRANSMISSION SOURCE SIGNAL | RECEPTION TIME |
|---|---|---|
| 0000009 | 0312345678 | 2019-12-22T12:22:33+09:00 |
| 0000012 | 0311112222 | 2019-12-22T17:05:51+09:00 |
| 0000014 | 0987654321 | 2019-12-22T19:05:02+09:00 |
| 0000015 | 0311112222 | 2019-12-23T12:05:29+09:00 |
| 0000016 | 0987654321 | 2019-12-23T13:13:38+09:00 |
| 0000017 | 0987654321 | 2019-12-24T14:05:02+09:00 |
| 0000018 | 0987654321 | 2019-12-24T14:45:21+09:00 |
| 0000019 | 0987654321 | 2019-12-24T15:55:46+09:00 |

FIG. 29

| MACHINE IDENTIFICATION NUMBER | FACSIMILE DATA ID |
|---|---|
| 3A10-115500 | 0000009 |
| 3A10-115500 | 0000012 |
| 3A10-115500 | 0000014 |
| 3A10-115500 | 0000015 |
| 3A10-115500 | 0000016 |

FIG. 33

| TRANSFER JOB EXECUTION STATE | ACCEPTANCE OF JOB | SORT SETTING INFORMATION ACQUISITION PROCESS | DATA TRANSFER PROCESS | EMAIL TRANSMISSION PROCESS | TRANSFER STATUS |
|---|---|---|---|---|---|
| A | ACCEPTED | NOT STARTED | NOT STARTED | NOT STARTED | ACCEPTED |
| B | ACCEPTED | BEING EXECUTED | NOT STARTED | NOT STARTED | ACCEPTED |
| C | ACCEPTED | COMPLETED NORMALLY | BEING EXECUTED | NOT STARTED | PROCESSING |
| D | ACCEPTED | COMPLETED NORMALLY | COMPLETED NORMALLY | BEING EXECUTED | COMPLETED |
| E | ACCEPTED | COMPLETED NORMALLY | COMPLETED NORMALLY | COMPLETED NORMALLY | COMPLETED |
| F | ACCEPTED | COMPLETED NORMALLY | ERROR | NOT STARTED | ERROR |
| G | ACCEPTED | COMPLETED NORMALLY | COMPLETED NORMALLY | ERROR | COMPLETED |

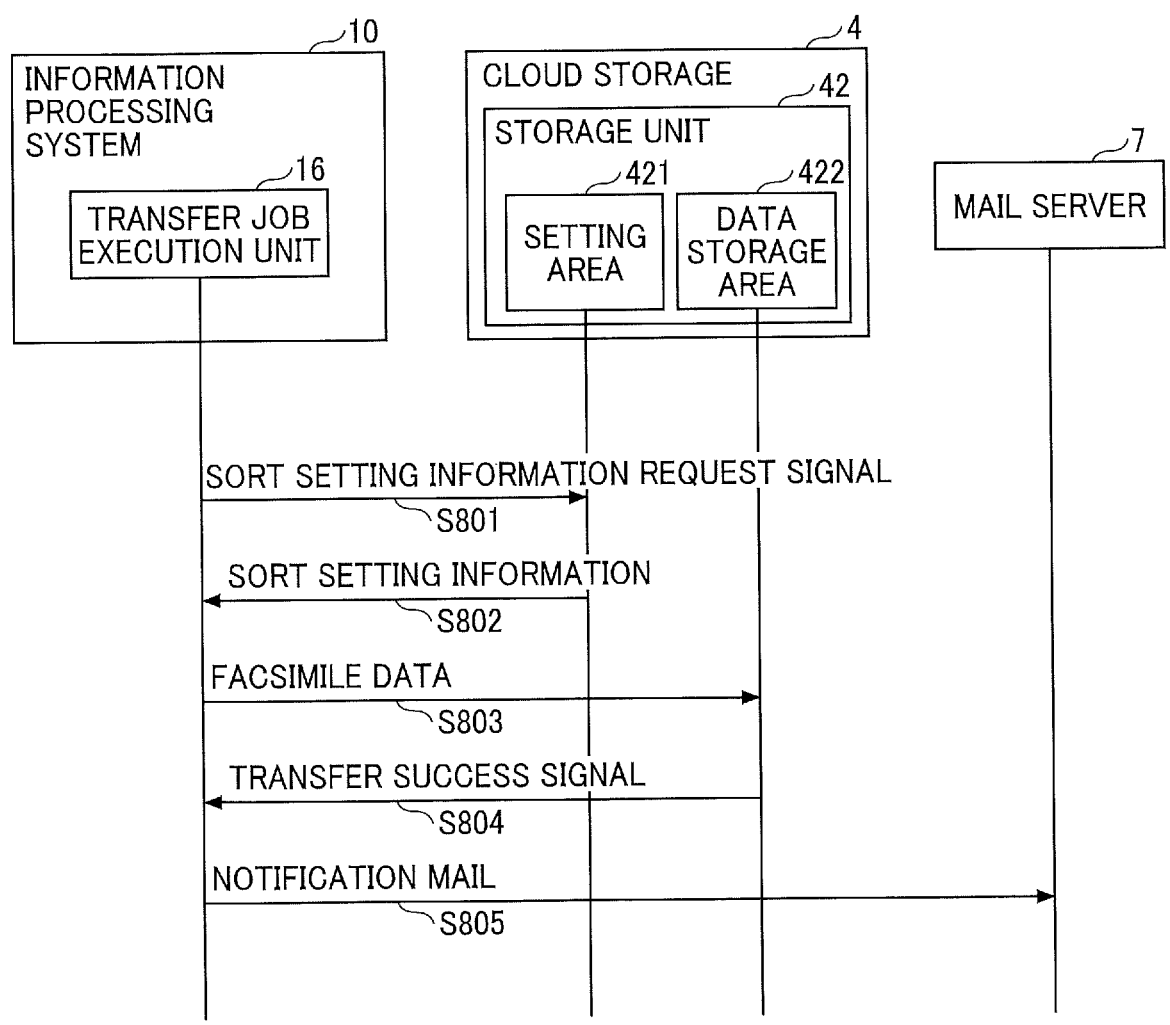

FIG. 36

| JOB ID | MACHINE IDENTIFICATION NUMBER | FACSIMILE DATA ID | TRANSFER STATUS |
|---|---|---|---|
| J0001 | 3A10-115500 | 0000001 | ERROR |
| J0002 | 3A10-115500 | 0000001 | COMPLETED |
| J0003 | 3A10-115500 | 0000002 | COMPLETED |
| J0004 | 3A10-115555 | 0000001 | COMPLETED |
| J0005 | 3A10-115500 | 0000003 | COMPLETED |
| J0006 | 3A10-115500 | 0000004 | COMPLETED |
| J0007 | 3A10-115500 | 0000005 | COMPLETED |
| J0008 | 3A10-115500 | 0000006 | COMPLETED |
| J0009 | 3A10-115500 | 0000007 | COMPLETED |
| J0010 | 3A10-115500 | 0000008 | COMPLETED |
| J0011 | 3A10-115500 | 0000009 | ERROR |
| J0012 | 3A10-115500 | 0000010 | PROCESSING |
| J0013 | 3A10-115500 | 0000011 | PROCESSING |
| J0014 | 3A10-115500 | 0000012 | ERROR |
| J0015 | 3A10-115500 | 0000013 | PROCESSING |
| J0016 | 3A10-115500 | 0000014 | ACCEPTED |
| J0017 | 3A10-115555 | 0000002 | PROCESSING |
| J0018 | 3A10-115588 | 0000001 | ACCEPTED |

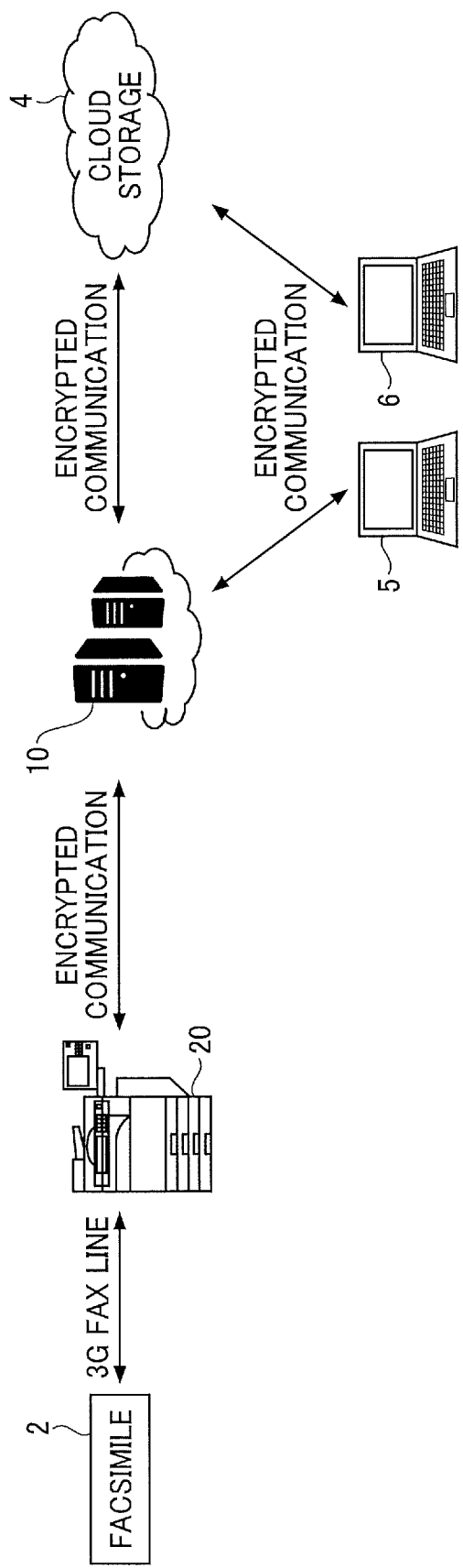

APPARATUS, DATA TRANSFER SYSTEM, AND DATA TRANSFER METHOD

CROSS-REFERENCE TO RELATED APPLICATIONS

This patent application is based on and claims priority pursuant to 35 U.S.C. § 119(a) to Japanese Patent Application Nos. 2020-191125, filed on Nov. 17, 2020, in the Japan Patent Office, the entire disclosure of which is hereby incorporated by reference herein.

BACKGROUND

Technical Field

The present disclosure relates to an apparatus, a data transfer system, and a data transfer method.

Description of the Related Art

In the related art, there is known a technique for sorting received image data to a predetermined destination before transferring the image data. For example, an information processing apparatus is disclosed. The information processing apparatus includes a controller configured to store data in a storage location associated with facsimile identification information assigned to a transmission source to perform facsimile communication.

SUMMARY

According to an aspect of the present disclosure, an apparatus includes circuitry that stores data that is received in a memory; acquires transfer history information indicating a transfer state of the data, from an information processing system that transfers the data to an external storage; identifies data to be transmitted from within the data stored in the memory, based on the transfer history information; and transmits the identified data to the information processing system.

According to another aspect of the present disclosure, a data transfer system includes the apparatus described above, and the information processing system described above. The information processing system transfers to the external storage the data transmitted from the apparatus.

According to another aspect of the present disclosure, a data transfer system includes an apparatus including first circuitry, and an information processing system including second circuitry. The first circuitry receives data and stores the received data in a memory; acquires transfer history information from the information processing system, the transfer history information indicating a transfer state of the data; identifies data to be transmitted from within the data stored in the memory, based on the transfer history information; and transmits the identified data to the information processing system. The second circuitry transfers to an external storage the data transmitted from the apparatus.

According to another aspect of the present disclosure, a data transfer method includes storing data that is received in a memory; acquiring transfer history information from an information processing system that transfers the data to an external storage, the transfer history information indicating a transfer state of the data; identifying data to be transmitted from within the data stored in the memory, based on the transfer history information; and transmitting the identified data to the information processing system.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 13 is a diagram illustrating an example data transfer function setting screen;

FIG. 17 is a diagram illustrating an example notification mail;

FIG. 18 is a diagram illustrating another example notification mail;

FIG. 19 is a diagram illustrating an example of queue information according to the first embodiment;

FIG. 22 is a diagram illustrating an example of non-transmission-target information;

FIG. 24 is a diagram illustrating an example of transmission-target information;

FIG. 25 is a diagram illustrating an example of queue information according to a second embodiment;

FIG. 28 is a diagram illustrating an example of accumulated information according to the second embodiment;

FIG. 29 is a diagram illustrating an example of deletion-target information according to the second embodiment;

FIG. 33 is a diagram illustrating a transfer status according to the third embodiment;

FIG. 34 is a diagram illustrating an example sequence of a transfer job execution process according to the third embodiment;

FIG. 36 is a diagram illustrating an example of transfer job execution history information according to the third embodiment;

FIG. 40 is a diagram illustrating an example communication method between apparatuses.

Figure 1:
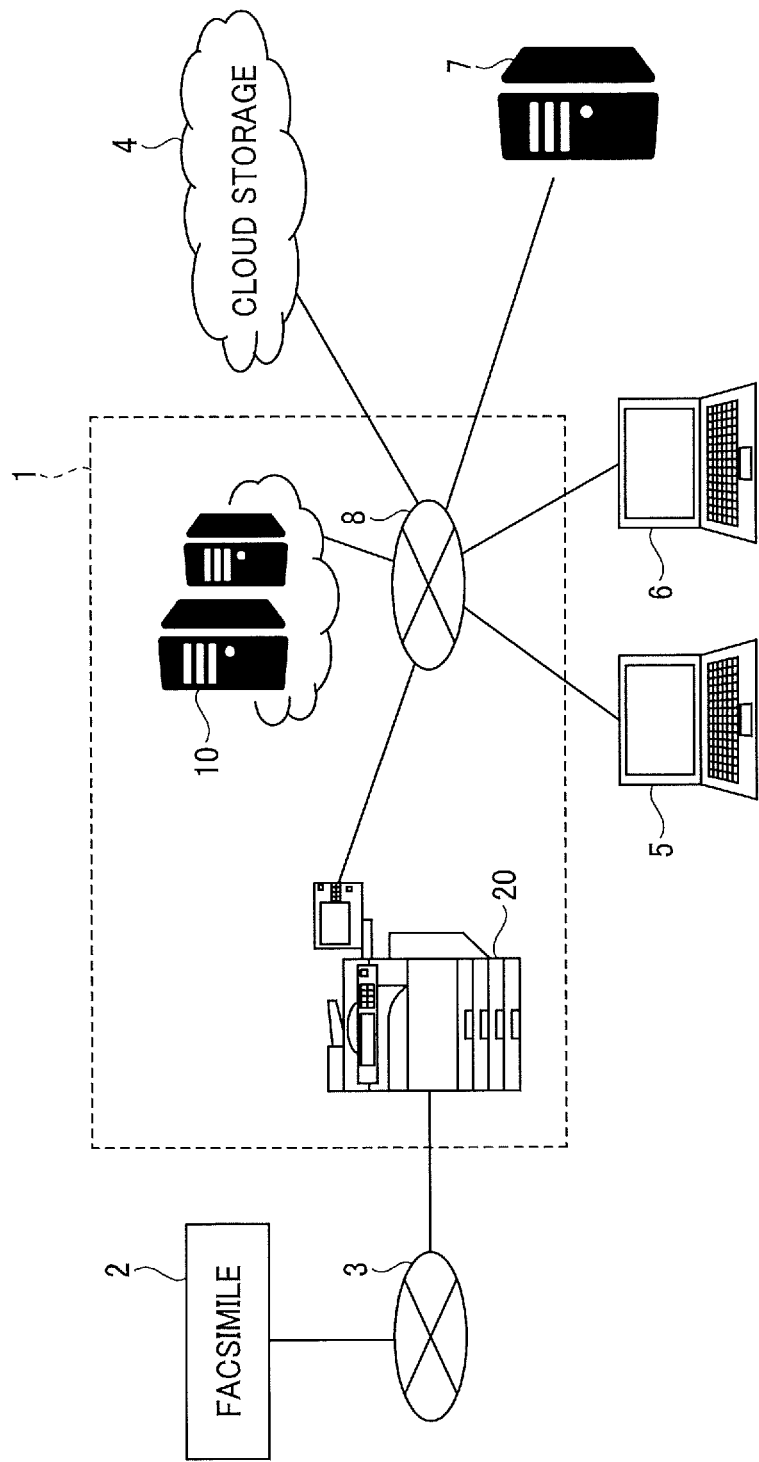
FIG. 1 is a diagram illustrating an example system configuration of a data transfer system.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First Embodiment

A data transfer system according to an embodiment will be described hereinafter with reference to the drawings.

FIG. 1 is a diagram illustrating an example system configuration of the data transfer system.

A data transfer system 1 according to this embodiment includes an information processing system 10 and an image forming apparatus 20.

The information processing system 10 is communicably connected to one or more image forming apparatuses 20 and an apparatus such as a terminal via a network 8. The information processing system 10 has a fundamental function, for example, an external coordination function for coordinating with external services such as user authentication, device authentication, tenant information management, device information management, user information management, screen information management, file management, and cloud storage. The information processing system 10 also has various functions including an application program interface (API) for executing each function in response to receipt of a request from an apparatus, and functions as a web service providing system that provides each function to the image forming apparatus 20 or an apparatus such as a terminal.

The information processing system 10 is constructed as, for example, a platform for providing cloud services of various functions. The information processing system 10 is constituted by a plurality of information processing apparatuses, and the plurality of information processing apparatuses process the functions described above in coordination with each other in a distributed manner. However, a single information processing apparatus may implement all of the functions. In the following description, the information processing system 10 executes processes of the respective functions. Actually, an information processing apparatus included in the information processing system 10 executes a process.

Further, the information processing system 10 executes, as the cloud services described above, processes specified in various web application programs (hereinafter referred to as web applications). Each web application is an application program specifying a function provided by the information processing system 10 serving as a web server to the image forming apparatus 20, which is a web client. Further, the information processing system 10 determines, for each web application, if any, whether each user or device is authorized to use the web application.

The information processing system 10 also includes workflow applications as web applications. The workflow applications are web applications for executing workflows specifying the flow of processes composed of units called components. One of the workflow applications is a data transfer application for transferring received data to a designated storage area, for example, a data transfer application for transferring facsimile data.

The information processing system 10 executes a process specified in the data transfer application to, as described below, transfer facsimile data received from the image forming apparatus 20 to a cloud storage 4 via the network 8. At this time, the information processing system 10 sorts facsimile data to a predetermined folder in the cloud storage 4 in accordance with set information, and stores the facsimile data in the folder. Then, the information processing system 10 transmits a notification mail to the email address to be notified, which is set in accordance with the sort destination, via a mail server 7. The number of cloud storages 4 is not limited to one and data may be transferred to a plurality of cloud storages 4. A single data transfer application may be used to designate storage areas (storage destinations) of a plurality of cloud storages 4 as sort destinations. Each data transfer application may be assigned a different cloud storage 4 as a sort destination.

The image forming apparatus 20 is an apparatus that implements image forming functions such as scanning, printing, copying, and facsimile transmission (faxing). The image forming apparatus 20 not only implements image forming functions alone but also functions as a web client that utilizes various functions provided by the information processing system 10. The device or apparatus (may be collectively referred to as apparatus) that transmits data to the information processing system 10 is not limited to an image forming apparatus, and data can be transmitted from various data transmission apparatuses to the information processing system 10.

The image forming apparatus 20 receives facsimile data from a facsimile 2 via a telephone network 3. The image forming apparatus 20 prints (forms an image of) the received facsimile data, stores the facsimile data in a storage area in the image forming apparatus 20, and transmits the stored facsimile data to the information processing system 10 via the network 8. The image forming apparatus 20 further includes, as a device application, a transmission application for transmitting the facsimile data to the information processing system 10. The apparatus that receives information, such as the image forming apparatus 20, may be any apparatus that receives data from various data transmission apparatuses other than the facsimile 2.

The network 8 is an example of a communication network and mainly refers to the Internet. However, the network 8 may be a wireless communication network or a wired communication network. Further, the network 8 is not limited to the Internet, and may be a local area network (LAN), a wide area network (WAN), a virtual private network (VPN), or the like. The telephone network 3 is also an example of a communication network and mainly refers to a facsimile (fax) line or the Internet. However, the telephone network 3 may be any other network.

Device identification information indicating one or more image forming apparatuses 20 and user identification information indicating a user or users who use the image forming apparatus or apparatuses 20 are managed by the tenant information management function of the information processing system 10 such that the device identification information and the user identification information belong to one tenant. The term "tenant" refers to a group or an organization to which a user belongs, such as a company, and tenant identification information identifying one tenant, and user identification information and device identification information belonging to the tenant are stored in the information processing apparatus of the information processing system 10 in association with each other. The information processing system 10 executes processes in coordination with a plurality of image forming apparatuses 20 belonging to a plurality of tenants.

The cloud storage 4 is a storage area that can be used by a person on the web. The cloud storage 4 provides a storage area having a capacity specified by a contract for each account to the user of the account. For example, a tenant administrator of a certain tenant who uses a cloud service provided by the information processing system 10 can use the storage area for the account (tenant account) in the cloud storage 4 for which the tenant administrator has made a contract to apply for use, as the storage area for an apparatus that operates in cooperation with the information processing system 10 (reference destination or transfer destination of information).

The facsimile data transferred from the information processing system 10 is stored in the storage area for the account in the cloud storage 4, which is used by the tenant to which the image forming apparatus 20 as the transfer source of the facsimile data belongs.

An administrator terminal 5 is a terminal used by the tenant administrator. In response to an operation by the tenant administrator, the administrator terminal 5 transmits input setting information for each web application to the information processing system 10. For example, the administrator terminal 5 transmits information referred to by the data transfer application, such as a storage area in the cloud storage 4 serving as a reference destination (storage location) of sort setting information specifying a method for sorting the facsimile data, and account information of the cloud storage 4 used for reference, to the information processing system 10, and sets the information in the data transfer application.

The tenant administrator uses the web browser of the administrator terminal 5 to access a web application (a data transfer application or an administrator-setting web page of the application) of the information processing system 10, a management site of the tenant to which the tenant administrator belongs, the cloud storage 4, and the like, and performs display and input on the web browser. The tenant administrator may use dedicated software other than the web browser. In the management site of the tenant to which the tenant administrator belongs, which is accessed from the administrator terminal 5, settings for the administrator, such as registration of a device (or apparatus) in the tenant to which the tenant administrator belongs, assignment and cancelation of a device license to a device (or apparatus), and assignment or cancelation of a user license to a tenant-registered user, can be set.

In response to an operation by the tenant administrator, furthermore, the administrator terminal 5 transmits sort setting information (such as a file in a tabular format) indicating the content of the settings for the sort destination of the facsimile data, which is referred to by the data transfer application, to the cloud storage 4 and stores the sort setting information in the cloud storage 4.

A user terminal 6 is a terminal used by the user of the image forming apparatus 20. In response to an operation by the user, the user terminal 6 acquires, from the cloud storage 4, the facsimile data transferred from the information processing system 10, and displays the facsimile data. Further, the user terminal 6 receives a notification mail transmitted from the information processing system 10 via the mail server 7. The user uses the web browser of the user terminal 6 to access the web application of the information processing system 10, the cloud storage 4, and the like, and performs display and input on the web browser. The user may use dedicated software other than the web browser.

Next, the hardware configuration of the apparatuses included in the data transfer system 1 according to this embodiment will be described.

Figure 2:
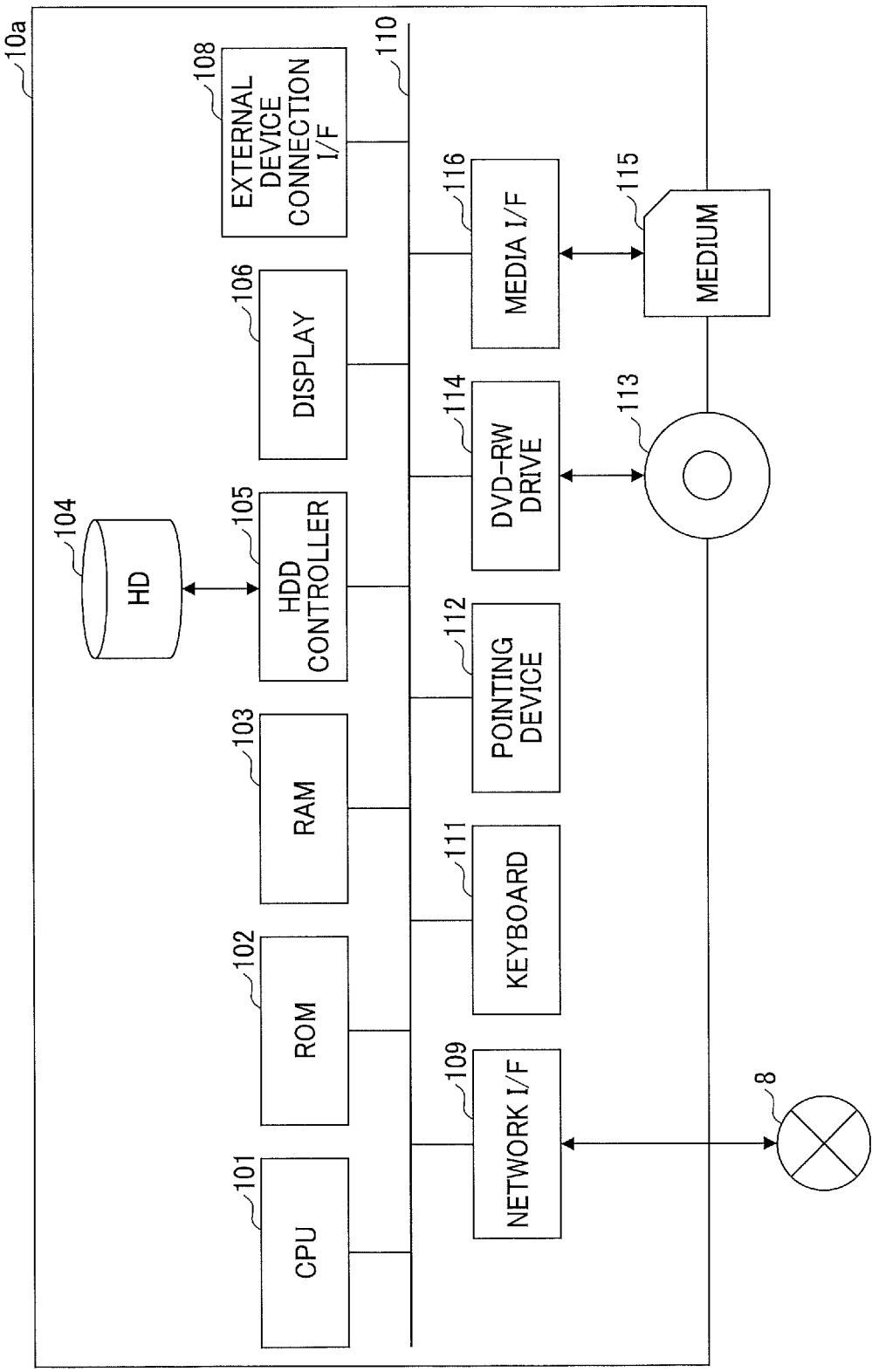
FIG. 2 is a diagram illustrating an example hardware configuration of an information processing apparatus.

FIG. 2 is a diagram illustrating an example hardware configuration of an information processing apparatus.

The information processing system 10 includes one or more information processing apparatuses. The information processing system 10 includes an information processing apparatus 10a. The information processing apparatus 10a is constituted by a computer and includes a central processing unit (CPU) 101, a read only memory (ROM) 102, a random access memory (RAM) 103, a hard disk (HD) 104, a hard disk drive (HDD) controller 105, a display 106, an external device connection interface (I/F) 108, a network I/F 109, a bus line 110, a keyboard 111, a pointing device 112, a digital versatile disk rewritable (DVD-RW) drive 114, and a media I/F 116.

The CPU 101 controls the overall operation of the information processing apparatus 10a. The ROM 102 stores a program used to drive the CPU 101, such as an initial program loader (IPL). The RAM 103 is used as a work area for the CPU 101. The HD 104 stores a program such as a guest network creation application and various other data. The HDD controller 105 controls reading or writing of various data from or to the HD 104 under the control of the CPU 101. The display 106 displays various kinds of information such as a cursor, a menu, a window, characters, and an image.

The external device connection I/F 108 is an interface for connecting various external devices. In this case, the external devices include, for example, devices such as a Universal Serial Bus (USB) memory and a printer. The network I/F 109 is an interface for performing data communication with the image forming apparatus 20 and the like using the network 8. The bus line 110 is an address bus, a data bus, or the like for electrically connecting the components illustrated in FIG. 2, such as the CPU 101.

The keyboard 111 is a kind of input device including a plurality of keys for inputting characters, numerical values, various instructions, and the like. The pointing device 112 is a kind of input device for selecting and executing various instructions, selecting an object to be processed, moving the cursor, and the like. A DVD-RW drive 114 controls reading or writing of various data from or to a DVD-RW 113, which is an example of a removable recording medium. The removable recording medium is not limited to a DVD-RW, and may be a DVD Recordable (DVD-R) or the like. The media I/F 116 controls reading or writing (storing) of data from or to a medium 115 such as a flash memory.

Figure 3:
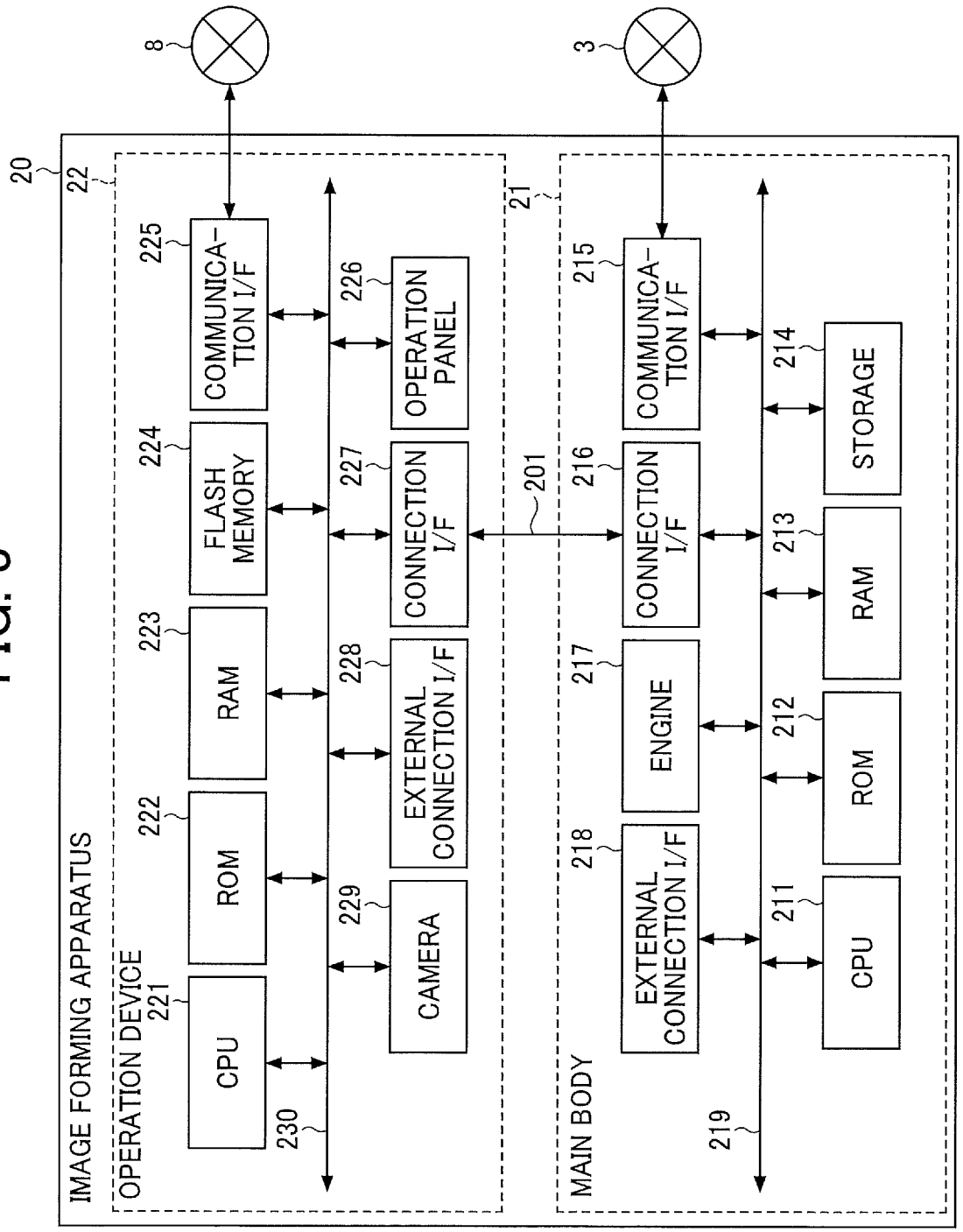
FIG. 3 is a diagram illustrating an example hardware configuration of an image forming apparatus.

FIG. 3 is a diagram illustrating an example hardware configuration of the image forming apparatus 20.

The image forming apparatus 20 includes a main body 21 that implements image forming functions, and an operation device 22 that accepts the user's operation. Accepting the user's operation is a concept including accepting information (including a signal indicating coordinate values on a screen) input in accordance with the user's operation.

The main body 21 and the operation device 22 are communicably connected to each other via a communication path 201. The communication path 201 may be based on the USB standard, for example. The communication path 201 may be based on a standard other than the USB standard, regardless of whether it is wired or wireless.

The main body 21 includes a CPU 211, a ROM 212, a RAM 213, a storage 214, a communication I/F 215, a connection I/F 216, an engine 217, an external connection I/F 218, and a system bus 219.

The CPU 211 is an arithmetic unit that executes a program stored in the ROM 212, the storage 214, or the like using the RAM 213 as a work area to control the overall operation of the main body 21. For example, the CPU 211 uses the engine 217 to implement various functions such as copying, scanning, faxing, and printing.

The ROM 212 is a non-volatile memory that stores, for example, a basic input/output system (BIOS), which is executed to activate the main body 21, various settings, and the like. The RAM 213 is a volatile memory used as a work area or the like for the CPU 211. The storage 214 is a non-volatile storage device that stores, for example, an operating system (OS), an application program, various data, and the like, and is implemented by, for example, an HDD, a solid state drive (SSD), or the like.

The communication I/F 215 is a network interface such as a wireless LAN or a wired LAN for connecting the main body 21 to the telephone network 3 to communicate with an external device such as the facsimile 2. The connection I/F 216 is an interface for performing communication between the main body 21 and the operation device 22 via the communication path 201.

The engine 217 is a hardware component configured to perform general-purpose information processing and processing other than communication to implement functions such as copying, scanning, faxing, and printing. The engine 217 includes, for example, a scanner (image reader) for scanning and reading an image of a document, a plotter (image former) for performing printing on a sheet material such as paper, a fax device for performing facsimile communication, and the like. The engine 217 may further include specific options such as a finisher for finishing printed sheet materials, and an automatic document feeder (ADF) for automatically feeding a document.

The external connection I/F 218 is an interface for connecting an external device to the main body 21. Examples of the external device include an integrated circuit (IC) card reader, and a mobile sensor. The system bus 219 is connected to the components described above and configured to transmit an address signal, a data signal, various control signals, and the like.

The operation device 22 includes a CPU 221, a ROM 222, a RAM 223, a flash memory 224, a communication I/F 225, an operation panel 226, a connection I/F 227, an external connection I/F 228, a camera 229, and a system bus 230.

The CPU 221 is an arithmetic unit that executes a program stored in the ROM 222, the flash memory 224, or the like using the RAM 223 as a work area to control the overall operation of the operation device 22. The ROM 222 is a non-volatile memory that stores, for example, a BIOS executed to activate the operation device 22, various settings, and the like. The RAM 223 is a volatile memory used as a work area or the like for the CPU 221. The flash memory 224 is a non-volatile storage device that stores, for example, an OS, an application program, various data, and the like.

The communication I/F 225 is a network interface such as a wireless LAN or a wired LAN for connecting the operation device 22 to the network 8 to communicate with an external device such as the information processing system 10.

The operation panel 226 accepts various inputs corresponding to the user's operations and displays various kinds of information. The operation panel 226 is, for example but not limited to, a liquid crystal display (LCD) having a touch panel function. The operation panel 226 may be implemented by, for example, an organic electroluminescence (EL) display having a touch panel function. Additionally or alternatively, the operation panel 226 may be provided with an operation device such as hardware keys, or a display device such as a lamp.

The connection I/F 227 is an interface for performing communication between the operation device 22 and the main body 21 via the communication path 201. The external connection I/F 228 is an interface such as a USB interface for connecting an external device. The camera 229 is an imaging capturing device that captures an image of the user.

The camera 229 may be installed outside the image forming apparatus 20 and connected to the operation device 22 via the external connection I/F 228. The system bus 230 is connected to the components described above and configured to transmit an address signal, a data signal, various control signals, and the like.

Next, the functional configuration of the apparatuses included in the data transfer system 1 according to this embodiment will be described.

Figure 4:
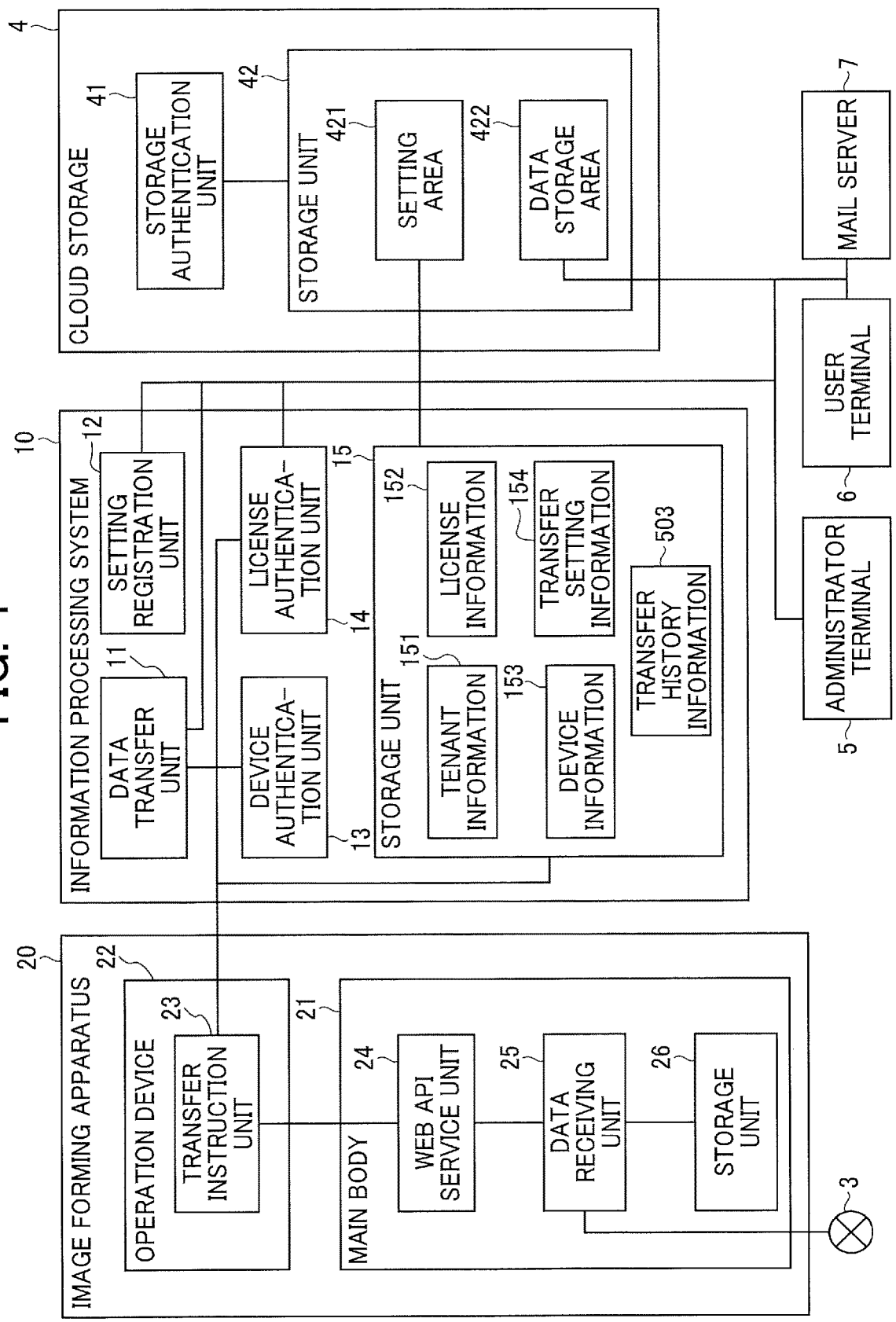
FIG. 4 is a diagram illustrating example functions of an information processing system and an image forming apparatus according to a first embodiment.

FIG. 4 is a diagram illustrating example functions of the information processing system 10 and the image forming apparatus 20 according to the first embodiment.

The information processing system 10 includes a data transfer unit 11, a setting registration unit 12, a device authentication unit 13, a license authentication unit 14, and a storage unit 15. The components described above are mounted in one or more information processing apparatuses 10a of the information processing system 10. For example, the functions of the information processing system 10 may be implemented in a distributed manner by an information processing apparatus A having fundamental functions such as the device authentication unit 13 and the license authentication unit 14, an information processing apparatus B having web applications such as the data transfer unit 11 and the setting registration unit 12, and an information processing apparatus C having a database that stores various kinds of information, such as the storage unit 15. Any other distribution method may be used, or all of the functions may be implemented by a single information processing apparatus 10a.

The data transfer unit 11 transfers facsimile data. Specifically, the data transfer unit 11 executes a process specified in a data transfer application (such as a facsimile transfer application). The data transfer unit 11 acquires sort setting information stored in a setting area 421 of a storage unit 42 of the cloud storage 4, sorts received facsimile data to each folder in accordance with the acquired sort setting information, and transmits the facsimile data to a data storage area 422 of the storage unit 42 of the cloud storage 4.

The setting registration unit 12 registers transfer setting information 154 indicating settings used for a process executed by the data transfer unit 11. Specifically, the setting registration unit 12 transmits data indicating a setting screen to the administrator terminal 5, and receives the transfer setting information 154 from the administrator terminal 5. Then, the setting registration unit 12 stores the received transfer setting information 154 in the storage unit 15. The setting registration unit 12 is implemented as an administrator-setting web page on which the tenant administrator performs setting the data transfer application.

The device authentication unit 13 authenticates the image forming apparatus 20. Specifically, in response to receipt of a signal requesting device authentication from the image forming apparatus 20, the device authentication unit 13 determines whether the machine identification number included in the signal is included in device information 153. If the device authentication unit 13 determines that the machine identification number is included in the device information 153, the device authentication unit 13 issues a device authentication ticket indicating that the device authentication has succeeded. The machine identification number is a number for identifying the image forming apparatus 20.

The license authentication unit 14 determines, based on license information 152 described below, whether the tenant has a license for using the web application. If the license authentication unit 14 determines that the tenant has the license, the license authentication unit 14 permits the use of the web application.

The storage unit 15 stores various kinds of information used for executing processes specified in the web application. For example, the storage unit 15 stores tenant information 151, license information 152, device information 153, transfer setting information 154, and transfer history information 503.

The tenant information 151 is information indicating the attribute of a tenant. For example, the tenant information 151 is information including items, such as "tenant ID" having a value representing an identifier identifying a tenant, and "tenant name" having a value representing the name of the tenant.

The license information 152 is information indicating a license set for each tenant based on a contract between an organization that opened the tenant and a management company of the information processing system 10 (cloud service). Specifically, the license information 152 indicates the number of licenses for using the web application for each tenant. There are several types of licenses, such as user license and device license. In the case of the device license, one image forming apparatus 20 is assigned to one license for the tenant.

The device information 153 is information indicating the attribute of a device (apparatus). In this embodiment, the device indicates the image forming apparatus 20. Specifically, the device information 153 is information including items, such as "machine identification number" having a value representing an identifier identifying a device (apparatus). The device information 153 is registered in association with the tenant information 151.

The transfer setting information 154 is setting information referred to by the data transfer unit 11. The transfer setting information 154 is input by the tenant administrator through a data transfer function setting screen displayed on the administrator terminal 5. The details of the data transfer function setting screen will be described below. The transfer history information 503 will also be described below.

The image forming apparatus 20 includes the main body 21 and the operation device 22.

The main body 21 implements image forming functions such as copying, scanning, and printing, that is, the internal functions of the image forming apparatus 20. Specifically, the main body 21 includes a web API service unit 24, a data receiving unit 25, and a storage unit 26.

The web API service unit 24 provides a web API to the operation device 22. The web API is an interface for using various functions of the main body 21. The web API includes an API for acquiring a machine identification number. The web API service unit 24 transmits the machine identification number stored in the main body 21 to the operation device 22 in response to an invocation of the API from the operation device 22.

The data receiving unit 25 receives facsimile data from the facsimile 2 via the telephone network 3. Then, the data receiving unit 25 stores the received facsimile data in the storage unit 26.

The storage unit 26 stores facsimile data. Further, the storage unit 26 stores the machine identification number of the image forming apparatus 20.

In response to the user's operation, the operation device 22 instructs the main body 21 to execute various processes. The operation device 22 includes an interface for selecting an application program to be activated. Specifically, the operation device 22 includes a transfer instruction unit 23.

The transfer instruction unit 23 transfers the facsimile data stored in the storage unit 26 to the information processing system 10. Specifically, in response to the data receiving unit 25 receiving facsimile data, the transfer instruction unit 23 registers a data transfer process in queue information stored in the RAM 223. The queue information is information indicating a queue of processes to be executed by the transfer instruction unit 23. The transfer instruction unit 23 executes processes of transferring data to the information processing apparatus including the data transfer unit 11 of the information processing system 10 one by one in the order registered in the queue information.

The transfer instruction unit 23 is implemented by a transfer application installed in the operation device 22 of the image forming apparatus 20. The tenant administrator can download the transfer application from an external application market server or the like and install the transfer application into the operation device 22 of the image forming apparatus 20.

The cloud storage 4 includes a storage authentication unit 41 and a storage unit 42.

The storage authentication unit 41 determines, for each account, whether the cloud storage 4 can be used.

The storage unit 42 is a storage area set for each account. Specifically, the storage unit 42 includes a setting area 421 and a data storage area 422.

The setting area 421 is an area where sort setting information is to be stored. The sort setting information is transmitted from the administrator terminal 5 in response to an operation by the tenant administrator.

The data storage area 422 is an area where facsimile data transferred from the information processing apparatus including the data transfer unit 11 of the information processing system 10 is to be stored. The data storage area 422 includes a plurality of folders. The sort setting information described above includes settings indicating, for each transmission source, a folder to which data from the transmission source is to be sorted.

Next, the operation of the data transfer system 1 will be described with reference to the drawings.

Figure 5:
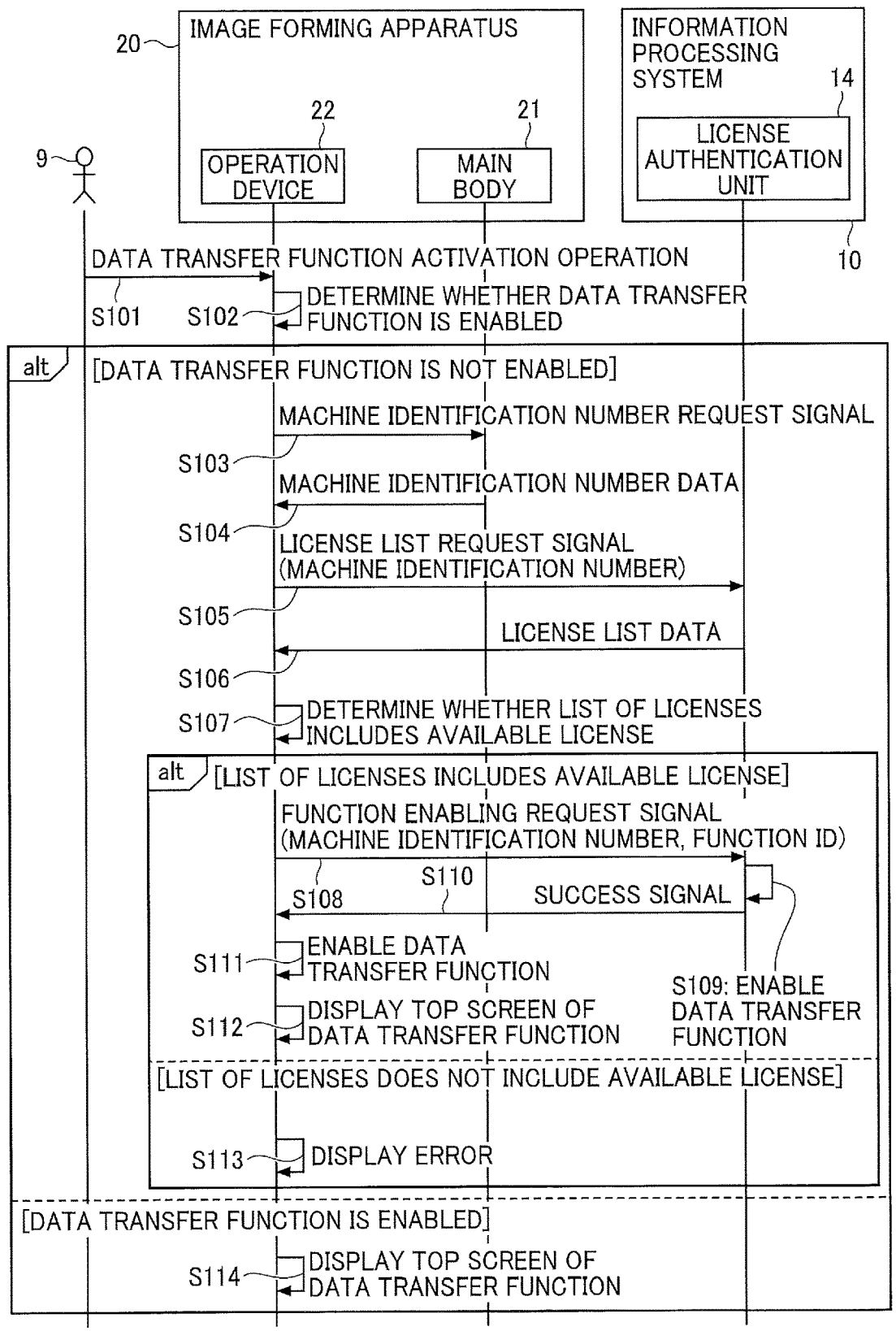
FIG. 5 is a diagram illustrating an example sequence of a data transfer function enabling process.

FIG. 5 is a diagram illustrating an example sequence of a data transfer function enabling process.

To use the processing of the data transfer unit 11 of the information processing system 10, a tenant administrator 9 performs an operation of activating the data transfer function on a screen for operating the operation device 22 of the image forming apparatus 20 (step S101).

Figure 6:
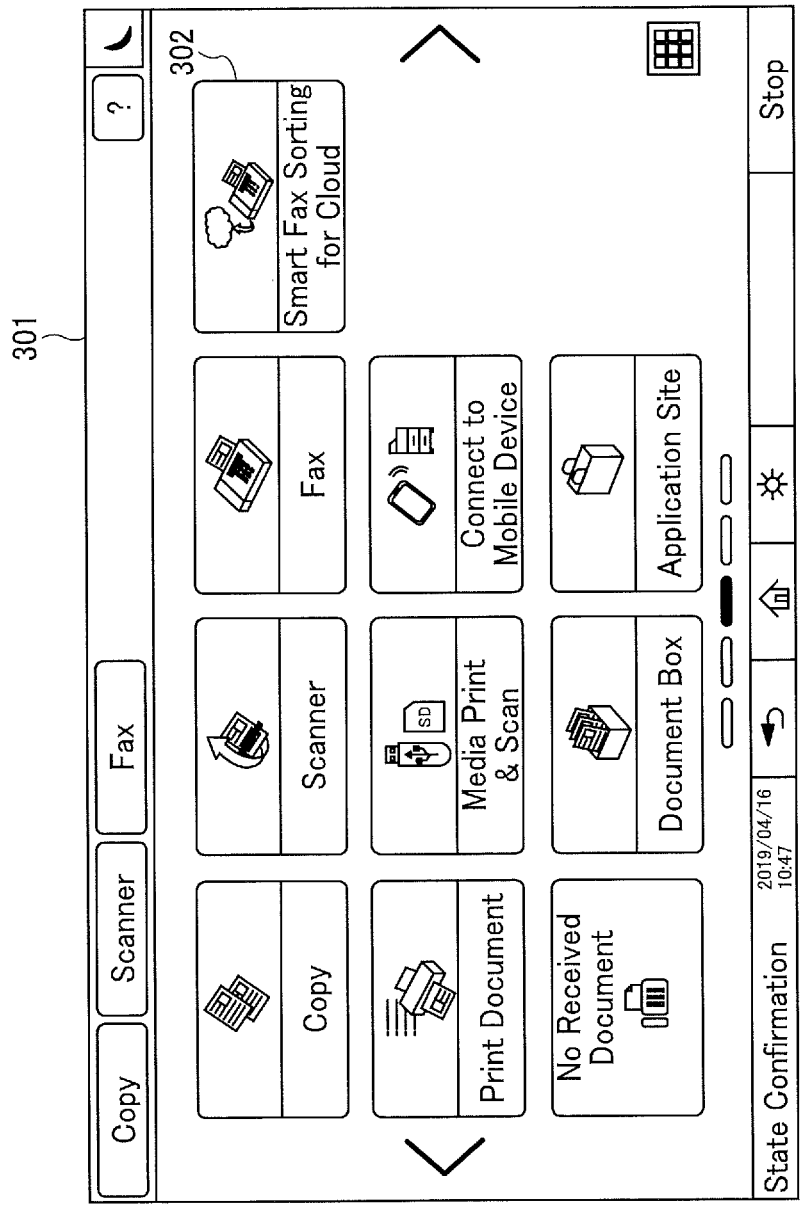
FIG. 6 is a diagram illustrating an example operation-device function list screen.

FIG. 6 is a diagram illustrating an example operation-device function list screen.

An operation-device function list screen 301 includes a list of buttons for selecting functions. The list of buttons for selecting functions includes a data transfer function selection button 302. The data transfer function selection button 302 is an icon image of a transfer application installed in the image forming apparatus 20. The tenant administrator 9 presses the data transfer function selection button 302 to perform an operation of activating the data transfer function.

Figure 7:
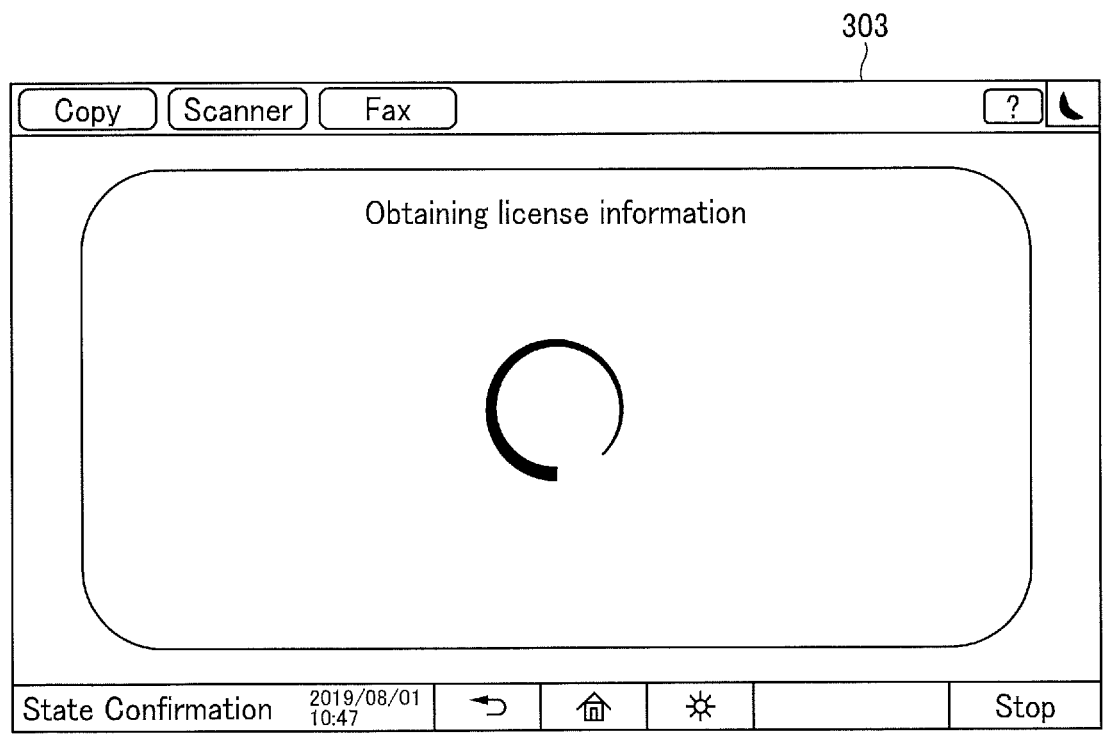
FIG. 7 is a diagram illustrating an example processing-in-progress screen in the data transfer function enabling process.

FIG. 7 is a diagram illustrating an example processing-in-progress screen in the data transfer function enabling process.

In response to the operation of activating the data transfer function, an authentication screen is displayed on the operation device 22. The operation device 22 receives user identification information such as an email address and a password through the authentication screen. The user identification information is transmitted to the information processing system 10. When the authentication function of the information processing system 10 authenticates that the user identification information indicates the tenant administrator 9, a processing-in-progress screen 303 is displayed on the operation device 22.

Referring back to FIG. 5, the transfer instruction unit 23 of the operation device 22 determines whether the data transfer function is enabled (step S102). Specifically, when flag information indicating that the data transfer function is enabled or disabled is stored, the transfer instruction unit 23 determines that the data transfer function is enabled.

If the transfer instruction unit 23 determines that the data transfer function is not enabled, the transfer instruction unit 23 transmits a signal requesting the machine identification number of the image forming apparatus 20 to the main body 21 (step S103). The web API service unit 24 of the main body 21 reads data indicating the machine identification number from the storage unit 26. Then, the web API service unit 24 transmits the data indicating the machine identification number to the operation device 22 (step S104).

The transfer instruction unit 23 of the operation device 22 transmits a signal requesting a list of licenses to the information processing system 10 (step S105). The signal requesting a list of licenses includes the machine identification number of the image forming apparatus 20. When the authentication of the tenant administrator 9 based on the user identification information is successful and the machine identification number of the image forming apparatus 20 is not associated with the tenant (when the image forming apparatus 20 is a device, or apparatus, not registered in the tenant), the machine identification number is automatically registered in the tenant.

The license authentication unit 14 of the information processing system 10 refers to the license information 152 and transmits data indicating a list of licenses (step S106). Specifically, the license authentication unit 14 identifies the tenant from the tenant information 151 associated with the transmitted machine identification number. Then, the license authentication unit 14 acquires, from the license information 152, list data indicating a list of web applications (web services) that the identified tenant has and for which the tenant has a contract, and a list of licenses for each web application (web service), and transmits the list data to the image forming apparatus 20.

The transfer instruction unit 23 of the operation device 22 determines whether the list of web applications under contract includes a web application of the information processing system 10 that is used as the transfer destination by the transfer application of the image forming apparatus 20, which is the transfer instruction unit 23, and determines whether the list of licenses for the web application includes an available license (step S107). Specifically, the transfer instruction unit 23 (transfer application) searches the list of web applications under contract for a web application corresponding to an application type designated by the transfer application. When the list of licenses for the web application corresponding to the transfer application, the licenses being contracted by the tenant, includes one or more licenses to which a device (apparatus) such as the image forming apparatus 20 is not assigned, the transfer instruction unit 23 determines that the list of licenses includes an available license.

If a validity period is set for each license, in step S106 or S107, the validity period may be added as a condition. When the information processing system 10 does not include a web application corresponding to the transfer application of the image forming apparatus 20, in step S106, the license authentication unit 14 may transmit a signal indicating an error.

When the transfer instruction unit 23 determines that the list of licenses includes an available license, the transfer instruction unit 23 transmits a signal requesting enabling of the data transfer function to the information processing system 10 (step S108). The signal requesting enabling of the data transfer function includes the machine identification number of the image forming apparatus 20.

The license authentication unit 14 enables the data transfer function (step S109). Specifically, the license authentication unit 14 selects one license to which no device is assigned among the licenses of the tenant, and registers the selected license in association with the received machine identification number. As a result, the number of licenses to which no device is assigned is decreased by 1.

Then, the license authentication unit 14 transmits a success signal to the image forming apparatus 20 (step S110). The transfer instruction unit 23 of the operation device 22 enables the data transfer function (step S111). Specifically, the transfer instruction unit 23 sets the value of the flag information indicating that the data transfer function is enabled or disabled to "enabled" and stores the flag information.

Thus, the next time an operation of activating the data transfer function is performed by the tenant administrator 9, in the processing of step S102, the transfer instruction unit 23 determines that the data transfer function is enabled.

After step S111, the transfer instruction unit 23 displays a top screen of the data transfer function (step S112).

If the transfer instruction unit 23 determines in the processing of step S107 that the list of licenses includes an available license, the transfer instruction unit 23 displays an error (step S113). Specifically, the transfer instruction unit 23 displays an error screen.

Figure 8:
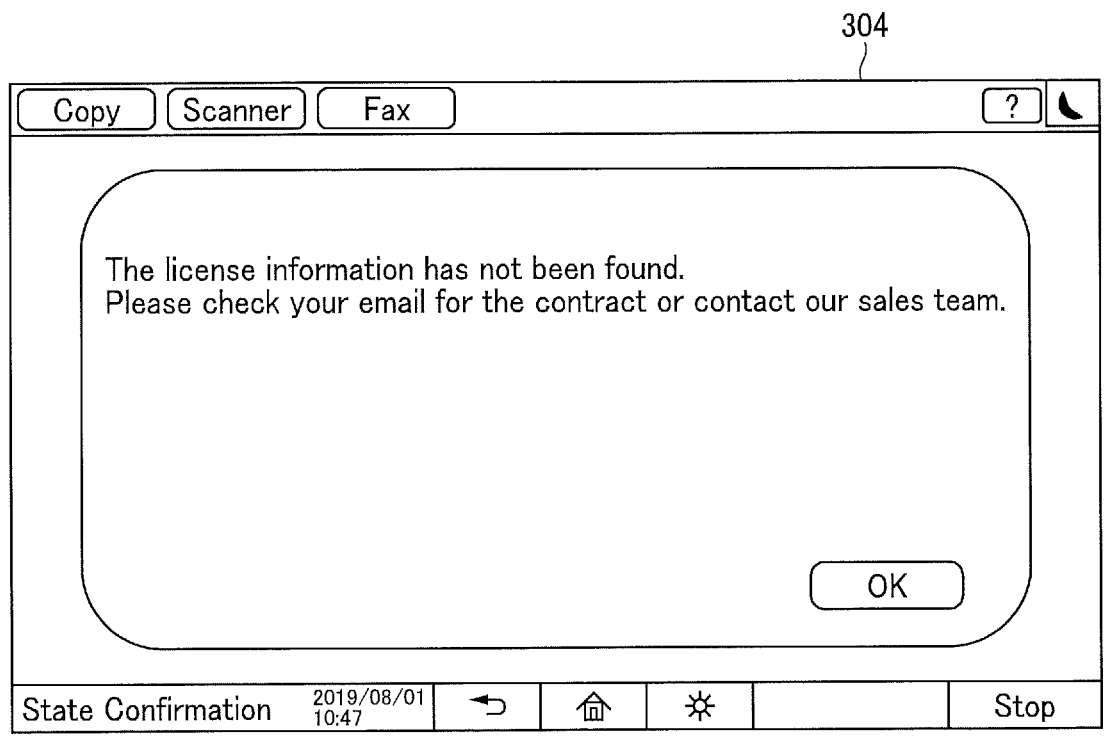
FIG. 8 is a diagram illustrating an example error screen in the data transfer function enabling process.

FIG. 8 is a diagram illustrating an example error screen in the data transfer function enabling process.

An error screen 304 displays a message indicating that no license has been confirmed.

Referring back to FIG. 5, when the transfer instruction unit 23 determines in the processing of step S102 that the data transfer function is enabled, the transfer instruction unit 23 displays the top screen of the data transfer function (step S114).

Figure 9:
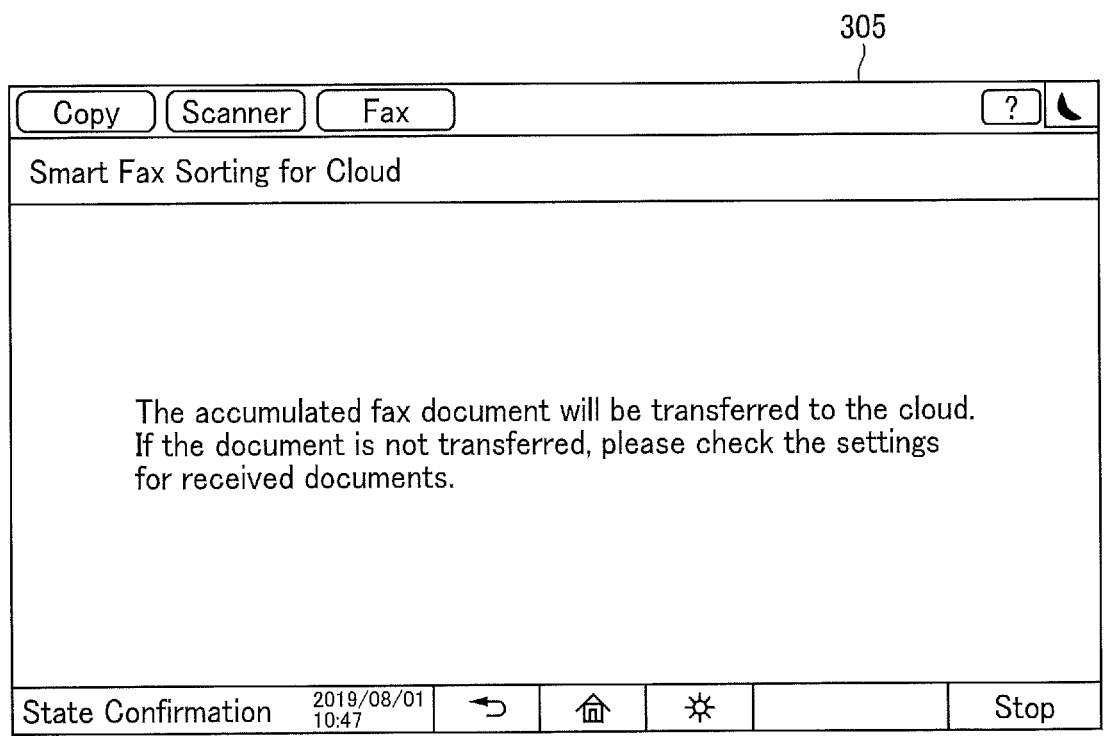
FIG. 9 is a diagram illustrating an example top screen of the data transfer function.

FIG. 9 is a diagram illustrating an example top screen of the data transfer function.

A top screen 305 displays a function introduction message indicating the content of the data transfer function. The top screen 305 is displayed when it is determined that the data transfer function is enabled and when an icon is pressed while the transfer application is in operation after the data transfer function is enabled. Since the data transfer function transfers data upon receipt of facsimile data, the top screen 305 does not include a display prompting a transfer operation. However, the top screen 305 may include a display for accepting an operation such as execution of batch transfer of pieces of accumulated facsimile data that have not been transmitted, or setting for transfer (such as designation of the batch transfer time or a file format for transfer).

Next, the operation of setting the data transfer function by the tenant administrator 9 will be described with reference to the drawings.

Figure 10:
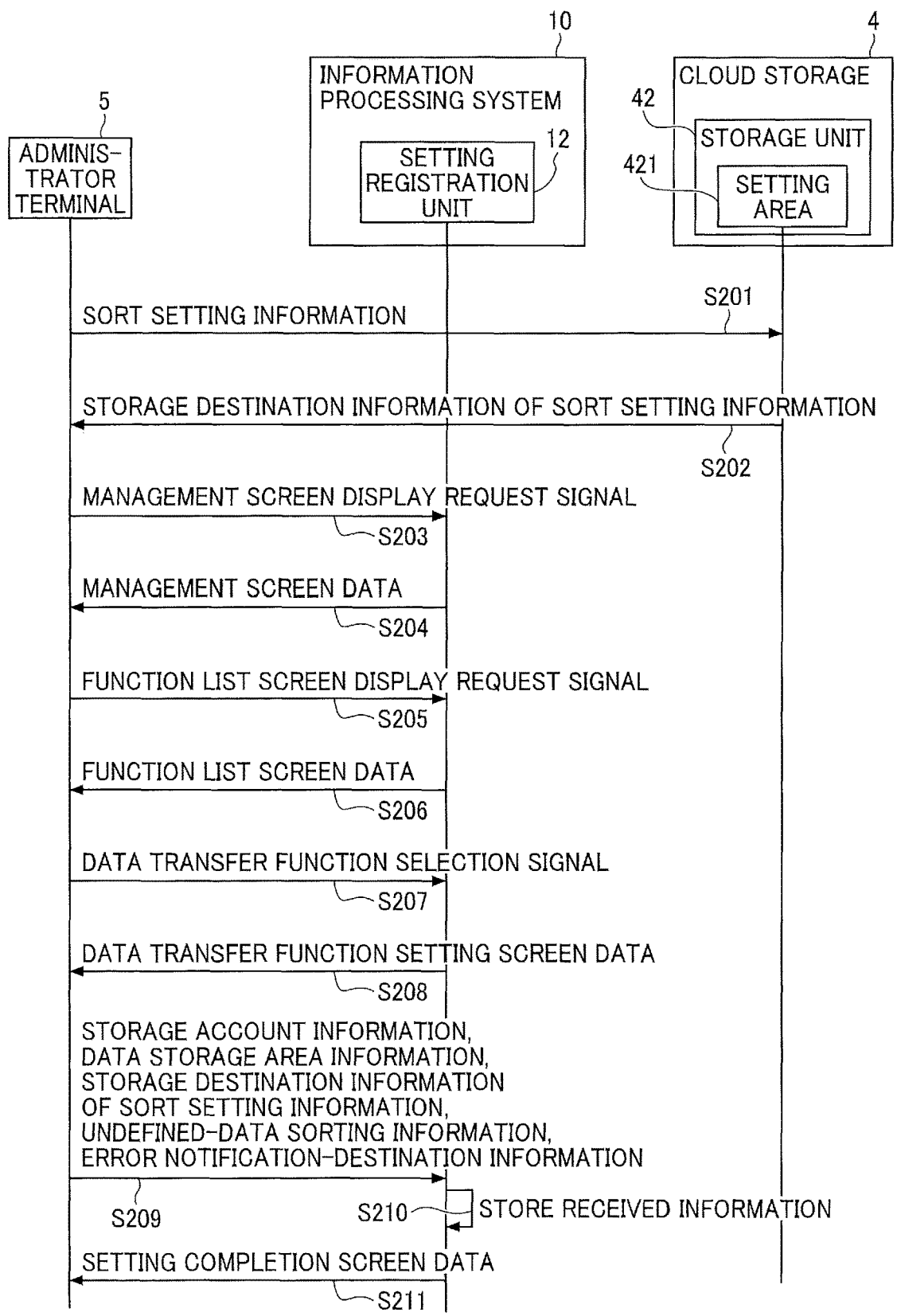
FIG. 10 is a diagram illustrating an example sequence of a data transfer function setting process.

FIG. 10 is a diagram illustrating an example sequence of a data transfer function setting process.

In response to an operation by the tenant administrator 9, the administrator terminal 5 generates sort setting information and transmits the sort setting information to the cloud storage 4 (step S201). The sort setting information is a file including tabular data, such as an Excel file. The administrator terminal 5 transmits the file to the cloud storage 4 in response to an operation of storing the file in a folder desired by the tenant administrator 9 on an operation screen displayed on the web browser of the administrator terminal 5 for operating the cloud storage 4.

Figures 11, 12:
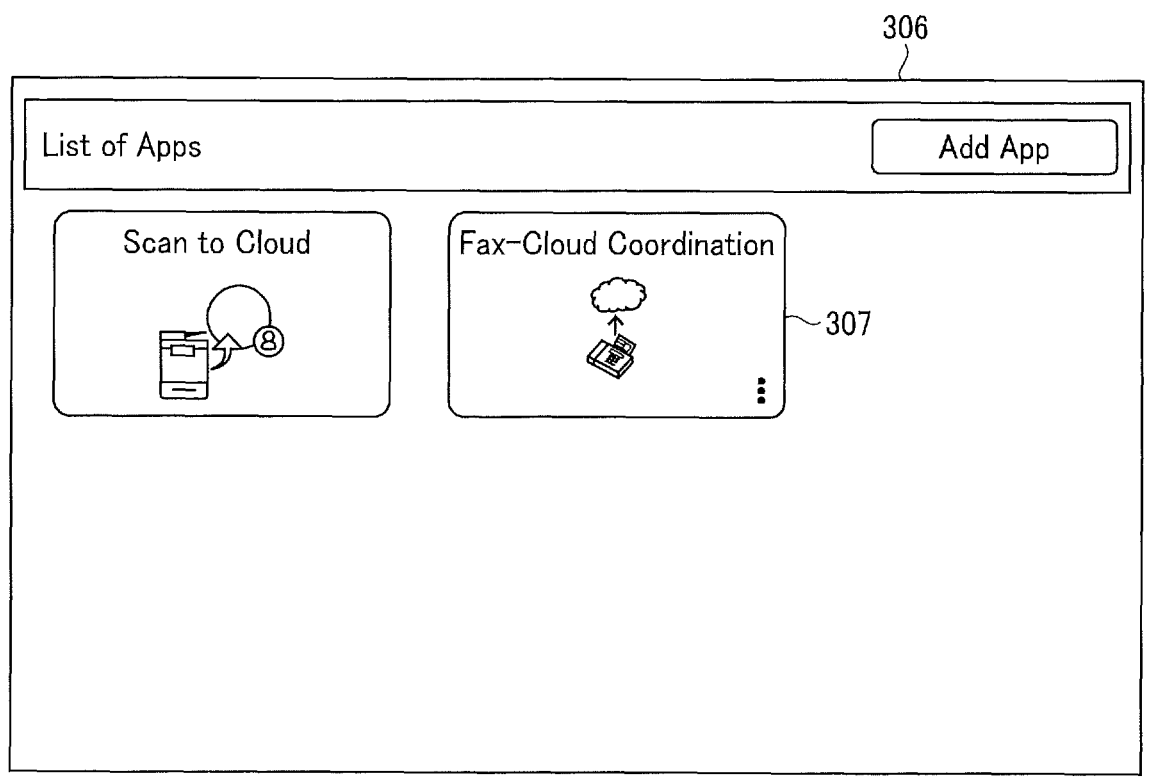
FIG. 11 is a diagram illustrating an example of sort setting information.
FIG. 12 is a diagram illustrating an example function list screen.

FIG. 11 is a diagram illustrating an example of sort setting information.

Sort setting information 501 includes items "transmission source number", "sort-destination folder name", and "email address to be notified".

The item "transmission source number" has a value indicating the fax number of the transmission source of facsimile data received by the image forming apparatus 20.

The item "sort-destination folder name" has a value indicating the name of the sort-destination folder serving as a storage location of the facsimile data. The folder name may be a company name, an organization name, or the like corresponding to the fax number of the transmission source of the facsimile data.

The item "email address to be notified" has a value indicating the email address of the transmission destination of the notification mail. The email address is an address accessible from a terminal such as the user terminal 6 or the administrator terminal 5.

Referring back to FIG. 10, in response to receipt of the sort setting information 501 from the administrator terminal 5, the cloud storage 4 stores the received sort setting information 501 in the setting area 421 of the storage unit 42. The setting area 421 is a storage destination folder of the sort setting information 501, which is selected on the web browser of the administrator terminal 5. When the storage destination folder is selected on the web browser of the administrator terminal 5, information indicating the storage destination of the sort setting information 501 is displayed in a uniform resource locator (URL) display field of the web browser. Thus, the information (URL) indicating the storage destination of the sort setting information 501 has been transmitted to the administrator terminal 5 (step S202).

In response to an operation by the tenant administrator 9, the administrator terminal 5 transmits a signal requesting display of a management screen to the information processing system 10 (step S203). The setting registration unit 12 of the information processing system 10 transmits data indicating a management screen for the web application (data transfer application) to the administrator terminal 5 (step S204).

The administrator terminal 5 displays the management screen. Then, in response to an operation by the tenant administrator 9, the administrator terminal 5 transmits a signal requesting display of a function list screen (step S205). The function list screen is a screen indicating a list of functions to be managed by the tenant to which the tenant administrator 9 belongs.

The setting registration unit 12 of the information processing system 10 transmits data indicating the function list screen to the administrator terminal 5 (step S206). The administrator terminal 5 displays the function list screen.

FIG. 12 is a diagram illustrating an example function list screen.

A function list screen 306 includes a list of buttons for selecting functions to be managed by the tenant to which the tenant administrator 9 belongs. The list of buttons includes a data transfer function selection button 307. The functions to be managed by the tenant are web applications (web services) under contract, and a management screen for the web applications under contract can be opened by the web browser of the administrator terminal 5.

In response to pressing of the data transfer function selection button 307, referring back to FIG. 10, the administrator terminal 5 transmits a data transfer function selection signal to the information processing system 10 (step S207). The setting registration unit 12 of the information processing system 10 transmits data indicating a data transfer function setting screen to the administrator terminal 5 (step S208). The administrator terminal 5 displays the data transfer function setting screen.

FIG. 13 is a diagram illustrating an example data transfer function setting screen.

A data transfer function setting screen 308 includes a storage account selection button 309, a data storage destination folder selection button 310, a sort setting information storage destination selection button 311, an undefined-data storage-destination folder name input field 312, an undefined-data notification-destination email address input field 313, and an error-case notification-destination email address input field 314.

The storage account selection button 309 is a graphical user interface (GUI) for selecting the account of the cloud storage 4, which is registered in advance by the tenant administrator 9. In a data transfer process described below, facsimile data is sorted and transferred to the storage area set for the selected account. The GUI is a button of a web page, an input item, or the like on a setting screen displayed on the web browser of the administrator terminal 5. The GUI is not limited to a web browser and may be implemented by a dedicated application.

The data storage destination folder selection button 310 is a GUI for selecting a folder to which the facsimile data is to be transferred from within the storage area set for the account selected with the storage account selection button 309. In the data transfer process described below, the facsimile data is sorted and transferred to a folder selected with the data storage destination folder selection button 310 and indicated by the value of the item "sort-destination folder name" of the sort setting information 501.

The sort setting information storage destination selection button 311 is a GUI for selecting the location where the sort setting information 501 is stored in the cloud storage 4. The location where the sort setting information 501 is stored is indicated by, for example, a combination of a path name and a file name.

The undefined-data storage-destination folder name input field 312 is a GUI for entering the name of a sort destination folder of facsimile data transmitted from a transmission source number not defined in the sort setting information 501.

The undefined-data notification-destination email address input field 313 is a GUI for entering the email address of the transmission destination of the notification mail when facsimile data is transmitted from a transmission source number not defined in the sort setting information 501.

The error-case notification-destination email address input field 314 is a GUI for entering the email address of the transmission destination of the notification mail when an error occurs in the data transfer function.

Referring back to FIG. 10, the administrator terminal 5 transmits the information entered by the tenant administrator 9, that is, storage account information, data storage area information, storage destination information of the sort setting information 501, undefined-data sorting information, and error notification-destination information, to the information processing system 10 (step S209).

The storage account information is information indicating an account selected in response to pressing of the storage account selection button 309. The storage account information includes, for example, an ID identifying an account, and a password for authentication.

The data storage area information is information indicating a storage area selected in response to pressing of the data storage destination folder selection button 310.

The storage destination information of the sort setting information 501 is information indicating a location selected in response to pressing of the sort setting information storage destination selection button 311.

The undefined-data sorting information is information indicating a folder name entered in the undefined-data storage-destination folder name input field 312, and an email address entered in the undefined-data notification-destination email address input field 313.

The error notification-destination information is information indicating an email address entered in the error-case notification-destination email address input field 314.

The setting registration unit 12 of the information processing system 10 stores the received information in the storage unit 15 as the transfer setting information 154 (step S210). Then, the setting registration unit 12 transmits data indicating a setting completion screen to the administrator terminal 5 (step S211).

Next, the operation of receiving facsimile data at the image forming apparatus 20 will be described with reference to the drawings.

Figures 14, 15:
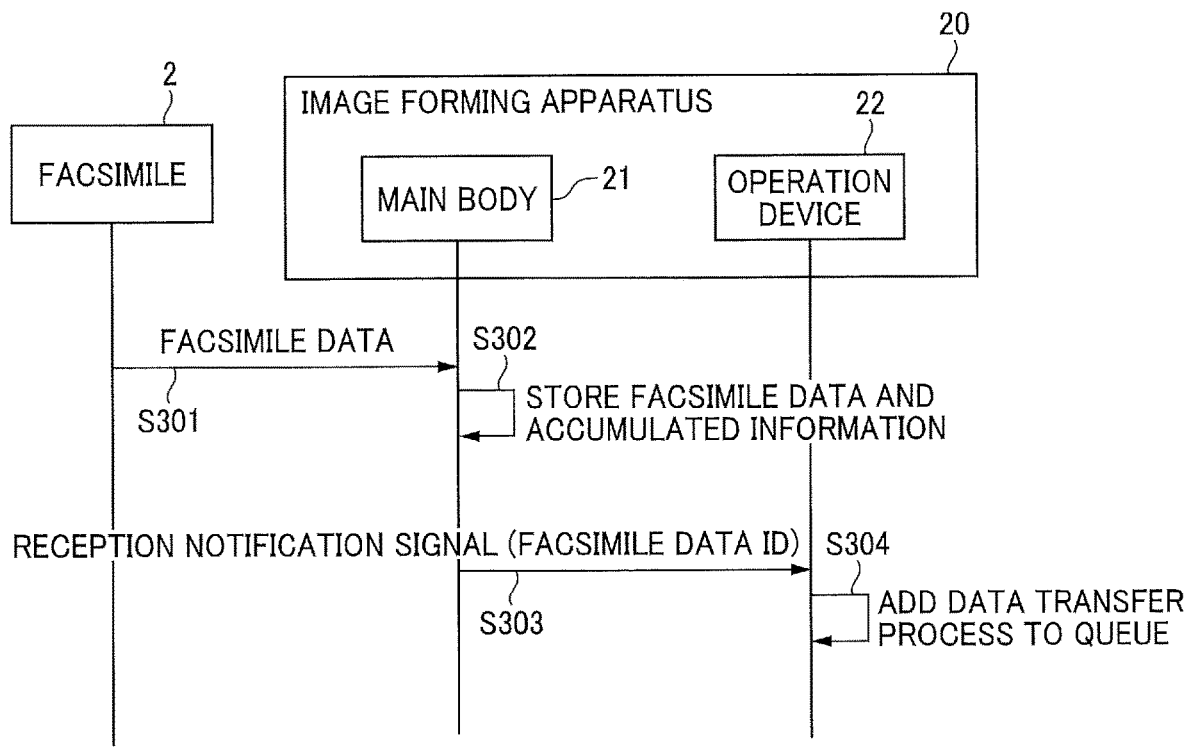
FIG. 14 is a diagram illustrating an example sequence of a data reception process.
FIG. 15 is a diagram illustrating an example of accumulated information according to the first embodiment.

FIG. 14 is a diagram illustrating an example sequence of a data reception process.

In response to a facsimile transmission operation, the facsimile 2 transmits facsimile data to the image forming apparatus 20 (step S301). The facsimile data includes image data and metadata. The metadata is data indicating the attribute of the image data and includes at least the fax number of the transmission source.

In response to receipt of the facsimile data via a fax line, the Internet, or the like, the data receiving unit 25 of the main body 21 of the image forming apparatus 20 stores the facsimile data and accumulated information in the storage unit 26 (step S302). Specifically, the data receiving unit 25 converts the image data included in the received facsimile data into, for example, a general-purpose data format such as a Portable Document Format (PDF) format and stores the resulting image data as facsimile data. Step S302 is an example of a data receiving step disclosed herein.

The data receiving unit 25 generates accumulated information, based on the metadata included in the facsimile data.

FIG. 15 is a diagram illustrating an example of accumulated information according to the first embodiment.

Accumulated information 261 includes items "facsimile data ID", "transmission source number", and "reception time".

The item "facsimile data ID" has a value representing an identifier for identifying received facsimile data. When inserting a record into the accumulated information 261, the data receiving unit 25 numbers a facsimile data ID.

The item "transmission source number" has a value representing the fax number of the transmission source of the facsimile data. The data receiving unit 25 extracts the fax number of the transmission source from the metadata and sets the value of the item "transmission source number".

The item "reception time" has a value representing the time at which the facsimile data is received. The data receiving unit 25 sets the time at which the facsimile data and the accumulated information are stored as the value of the item "reception time".

Referring back to FIG. 14, the data receiving unit 25 transmits a signal (reception notification signal) indicating that the facsimile data has been received to the operation device 22 (step S303). The reception notification signal includes the facsimile data ID.

The transfer instruction unit 23 of the operation device 22 adds a data transfer process to the queue (step S304).

Specifically, the transfer instruction unit 23 adds a record indicating a process for transferring the received facsimile data to the end of the queue in the queue information stored in the RAM 223.

Next, the operation of transferring facsimile data in the data transfer system 1 will be described with reference to the drawings.

Figure 16:
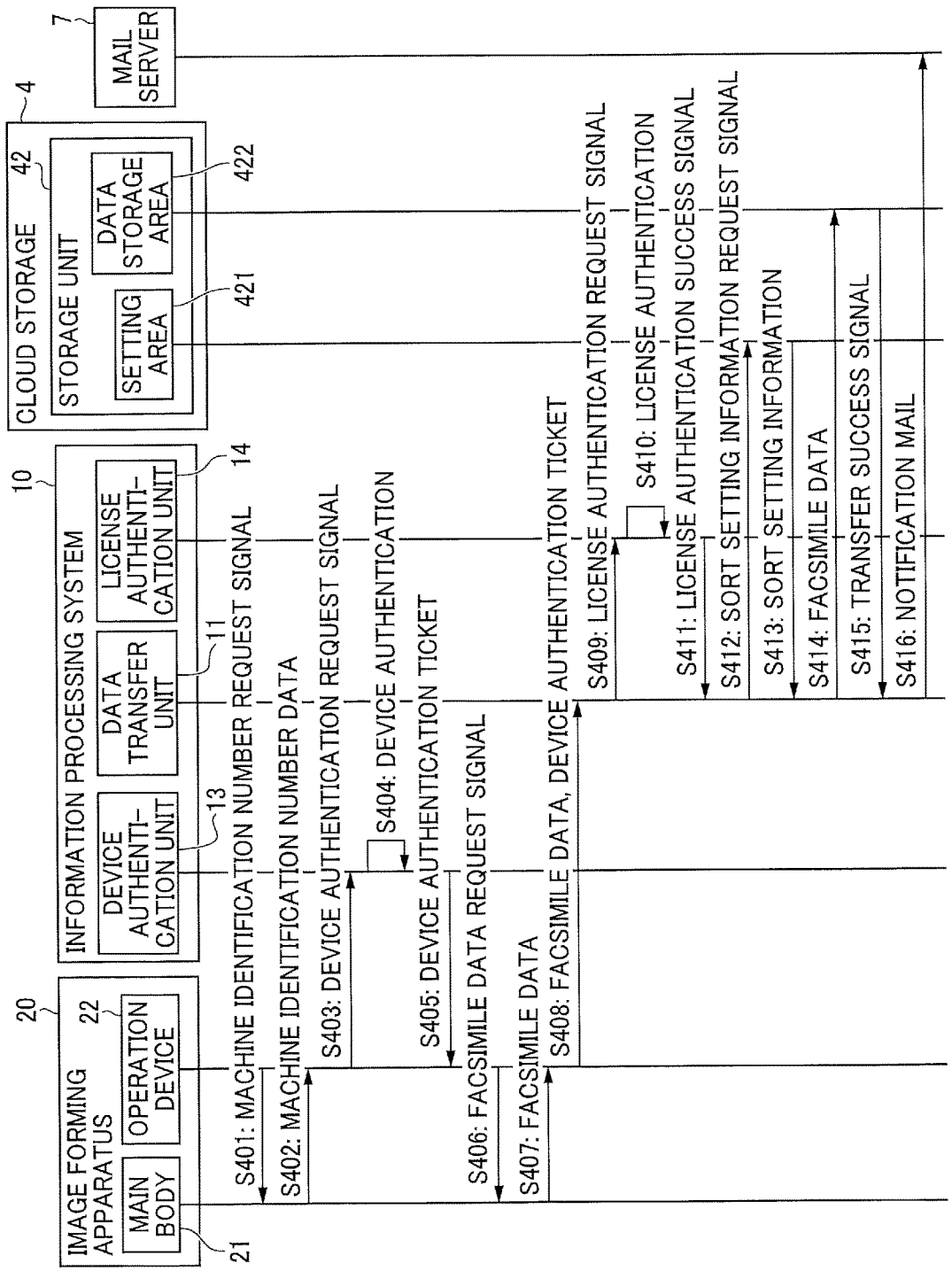
FIG. 16 is a diagram illustrating an example sequence of a data transfer process according to the first embodiment.

FIG. 16 is a diagram illustrating an example sequence of a data transfer process according to the first embodiment.

In response to completion of the execution of the preceding process in the queue information, the transfer instruction unit 23 of the operation device 22 starts the data transfer process. The transfer instruction unit 23 transmits a signal requesting the machine identification number of the image forming apparatus 20 to the main body 21 (step S401).

The web API service unit 24 acquires machine identification number data stored in the storage unit 26 and transmits the acquired machine identification number data to the operation device 22 (step S402).

Then, the transfer instruction unit 23 of the operation device 22 transmits a signal requesting device authentication to the information processing system 10 (step S403). The signal requesting device authentication includes the machine identification number data.

The device authentication unit 13 of the information processing system 10 authenticates the device (apparatus) (step S404). Specifically, the device authentication unit 13 determines whether the machine identification number is included in the device information 153. If the device authentication unit 13 determines that the machine identification number is included in the device information 153, the device authentication unit 13 transmits a device authentication ticket indicating that the device authentication has succeeded to the image forming apparatus 20 (step S405).

Then, the transfer instruction unit 23 of the operation device 22 transmits a signal requesting facsimile data to the main body 21 (step S406). The signal requesting facsimile data includes a facsimile data ID. The main body 21 acquires facsimile data from the storage unit 26, based on the facsimile data ID included in the received signal, and transmits the acquired facsimile data to the operation device 22 (step S407).

The transfer instruction unit 23 of the operation device 22 transmits the facsimile data together with the device authentication ticket to the information processing system 10 (step S408). Step S408 is an example of a transmission instruction step disclosed herein.

In response to receipt of the facsimile data, the data transfer unit 11 stores the facsimile data in the storage unit 15 as transfer history information of the facsimile data. The transfer history information is information indicating the transfer state of the facsimile data, including a transfer status. Specifically, the data transfer unit 11 stores the transfer status included in the transfer history information as "accepted", which is a value indicating that a transfer instruction has been accepted.

The data transfer unit 11 transmits a signal requesting license authentication to the license authentication unit 14 (step S409).

The license authentication unit 14 executes license authentication (step S410). Specifically, the license authentication unit 14 identifies a machine identification number based on the device authentication ticket, and determines whether the license of the tenant corresponding to the machine identification number is assigned the device (apparatus) corresponding to the machine identification number.

As a result, the license authentication unit 14 can determine whether the data transfer function is enabled.

The license authentication unit 14 may determine whether the corresponding license is within the validity period.

When the license authentication is successful, the license authentication unit 14 transmits a signal indicating successful license authentication to the data transfer unit 11 (step S411).

Then, the data transfer unit 11 transmits a signal requesting the sort setting information 501 to the cloud storage 4 (step S412). Specifically, the signal requesting the sort setting information 501, which is transmitted from the data transfer unit 11, includes the storage destination information of the sort setting information 501 and the storage account information, which are included in the transfer setting information 154.

The storage authentication unit 41 of the cloud storage 4 performs authentication based on the received storage account information. Specifically, the storage authentication unit 41 determines whether to permit reading of data from the setting area 421. When the storage authentication unit 41 determines that the reading is permitted, the cloud storage 4 transmits the sort setting information 501 stored in the setting area 421 to the information processing system 10 (step S413). The data transfer unit 11 updates the transfer status included in the transfer history information stored in the storage unit 15 to "processing", which is a value indicating that the transfer process is in progress.

The data transfer unit 11 of the information processing system 10 transmits the facsimile data to the cloud storage 4 (step S414). Specifically, the data transfer unit 11 sorts the facsimile data to each folder in accordance with the received sort setting information 501, and transmits the facsimile data to the cloud storage 4 together with information designating the folder to which the facsimile data is sorted.

The sort setting information 501 is an Excel file or the like including tabular data. In response to acquiring an Excel file, the data transfer unit 11 (web application) converts the Excel format (tabular format) into the JavaScript Object Notation (JSON) format. Then, the data transfer unit 11 uses the fax number, the folder name, and the email address included in the conversion result to store the received facsimile data in the PDF file format in the folder having the folder name corresponding to the transmission source number (fax number) of the facsimile data. If the folder having the folder name corresponding to the transmission source number (fax number) is not included in the storage destination, the data transfer unit 11 causes the cloud storage 4 to create a folder having the corresponding folder name. Then, the data transfer unit 11 stores the facsimile data in the PDF file format in the created folder.

In the case of facsimile data received from a transmission source number not defined in the sort setting information 501, the data transfer unit 11 designates the folder name included in the undefined-data sorting information as the storage location at the sort destination.

The data transfer unit 11 may transmit information designating the file name after the transfer, together with the facsimile data. The file name includes, for example, the transmission source name, the transmission date, and the transmission source number. The data transfer unit 11 may change the file name using the transmission source name, the transmission date, and the transmission source number and then perform transmission. The transmission source name is the same as the name of the sort-destination folder. The transmission source name may be information included in the metadata of the facsimile data. If facsimile data for which the transmission source number is not defined in the sort setting information 501 is transferred, the transmission source number may be used instead of the transmission source name.

The storage authentication unit 41 of the cloud storage 4 performs authentication based on the received storage account information. Specifically, the storage authentication unit 41 determines whether to permit writing of data to the data storage area 422. When the storage authentication unit 41 determines that the writing is permitted, the cloud storage 4 stores the received facsimile data in a designated folder in the data storage area 422.

Then, the cloud storage 4 transmits a signal indicating successful data transfer (transfer success signal) to the information processing system 10 (step S415). The data transfer unit 11 updates the transfer status included in the transfer history information stored in the storage unit 15 to "completed", which is a value indicating completion of the transfer.

The data transfer unit 11 transmits a notification mail indicating completion of the transfer and the sort destination of the facsimile data to the mail server 7 (step S416). Specifically, the data transfer unit 11 transmits a notification mail whose destination is set as the value of the item "email address to be notified" in the sort setting information 501. The mail server 7 transmits the received notification mail to a designated destination.

If an error has occurred in any of the processes described above, the data transfer unit 11 transmits a notification mail indicating the occurrence of an error to the email address included in the error notification-destination information.

FIG. 17 is a diagram illustrating an example notification mail.

A notification mail 701 is an example of a notification mail for transfer of facsimile data for which the transmission source number is defined in the sort setting information 501. For example, in a case where facsimile data is sorted to the folder "ABC", a path name and a file name including "ABC" are included in the body of the notification mail.

FIG. 18 is a diagram illustrating another example notification mail.

A notification mail 702 is an example of a notification mail for transfer of facsimile data for which the transmission source number is not defined in the sort setting information 501. For example, in a case where facsimile data is sorted to the folder "undefined", a path name and a file name including "undefined" is included in the body of the notification mail. The destination of the notification mail 702 is the email address included in the undefined-data sorting information.

Next, a retransmission process performed in case of failure of facsimile data transfer will be described with reference to the drawings. Specifically, a retransmission process in a case where the transmission of facsimile data from the image forming apparatus 20 to the information processing system 10 has succeeded, but the transfer of the facsimile data from the information processing system 10 to the cloud storage 4 has failed will be described. In addition to the retransmission process, for example, the transfer instruction unit 23 may collectively transmit, to the information processing system 10, facsimile data that has not been transmitted from the image forming apparatus 20 to the information processing system 10 due to a transmission failure caused by a communication error or the like. In a real-time transmission process in which each time the image forming apparatus 20 receives facsimile data, the image forming apparatus 20 transmits the facsimile data to the information processing system 10, the transfer instruction unit 23 may also check data that has not been transmitted and data to be retransmitted and transmit such data.

FIG. 19 is a diagram illustrating an example of queue information according to the first embodiment.

Queue information 502 according to this embodiment includes items "queue ID", "process", and "facsimile data ID".

The item "queue ID" has a value representing an identifier for identifying a process registered in the queue.

The item "process" has a value representing the name of a process registered in the queue.

The item "facsimile data ID" has a value representing an identifier for identifying facsimile data to be subjected to a process registered in the queue.

The transfer instruction unit 23 of the operation device 22 according to this embodiment registers, in the queue information 502, a data transfer process for transferring facsimile data and a retransmission process for transmitting facsimile data for which transfer has failed.

When the transfer instruction unit 23 registers a data transfer process in the queue information 502, the transfer instruction unit 23 has determined facsimile data to be transferred. The facsimile data to be transferred is facsimile data received from the facsimile 2.

The transfer instruction unit 23 registers a retransmission process in the queue information 502 periodically, for example, every hour. When the transfer instruction unit 23 registers a retransmission process in the queue information 502, the transfer instruction unit 23 has not determined facsimile data to be retransmitted. The transfer instruction unit 23 determines facsimile data to be retransmitted, when executing the retransmission process. Thus, no value is registered in the "facsimile data ID" for a record of a retransmission process in the queue information 502.

Next, the operation of the retransmission process will be described with reference to the drawings.

Figure 20:
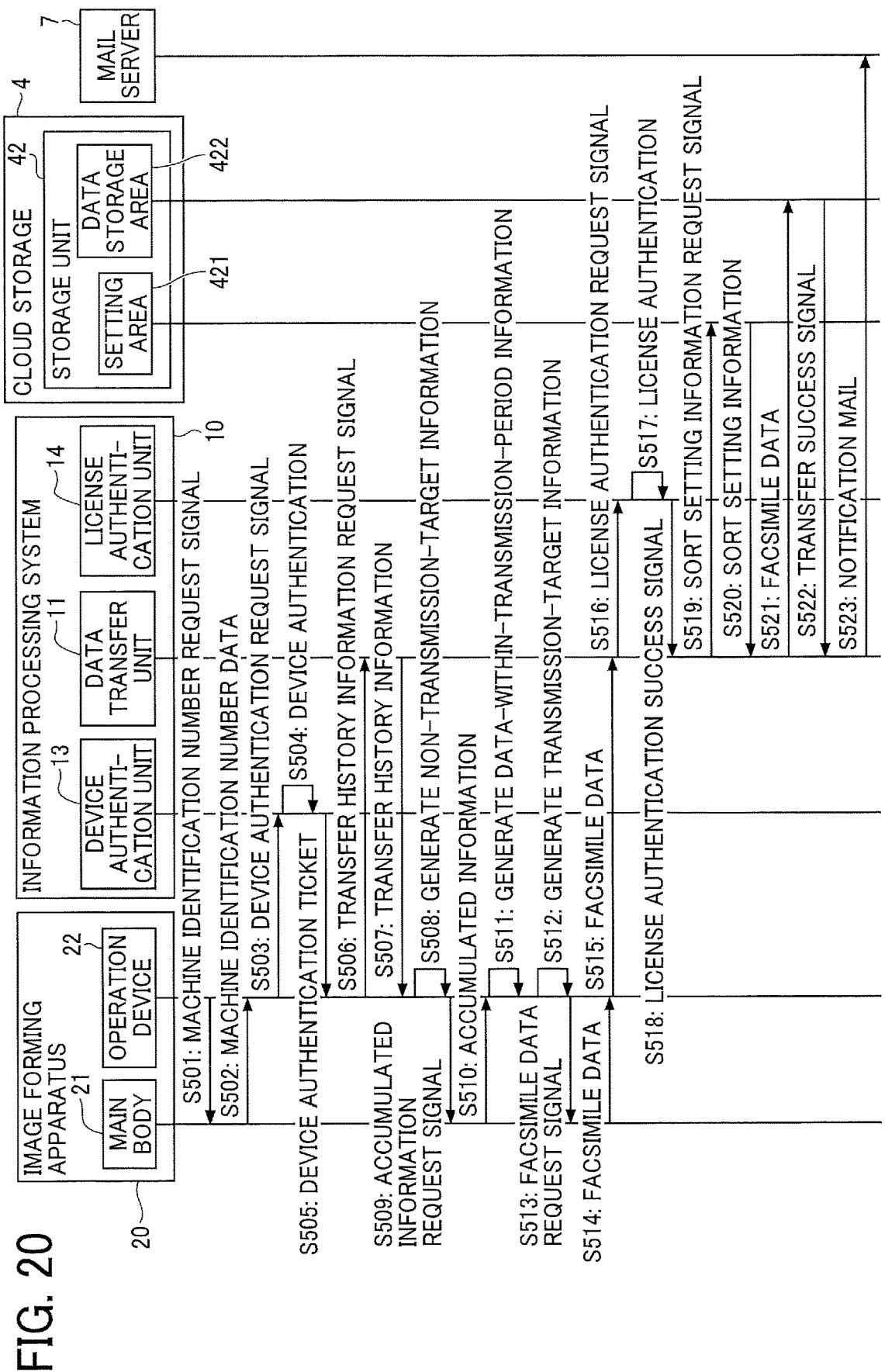
FIG. 20 is a diagram illustrating an example sequence of a retransmission process according to the first embodiment.

FIG. 20 is a diagram illustrating an example sequence of a retransmission process according to the first embodiment.

The transfer instruction unit 23 of the operation device 22 executes processes registered in the queue information 502 according to the order of registration. At the turn for a retransmission process, the transfer instruction unit 23 starts the retransmission process illustrated in FIG. 20.

When the retransmission process is started, the transfer instruction unit 23 transmits a signal requesting the machine identification number of the image forming apparatus 20 to the main body 21 (step S501). The main body 21 transmits data indicating the machine identification number to the operation device 22 (step S502).

Then, the transfer instruction unit 23 of the operation device 22 transmits a signal requesting device authentication to the information processing system 10 (step S503). The device authentication unit 13 of the information processing system 10 performs device authentication (step S504). When the device authentication is successful, the device authentication unit 13 issues a device authentication ticket and transmits the device authentication ticket to the image forming apparatus 20 (step S505).

In the subsequent processing, when transmitting a signal requesting a process to the information processing system 10, the transfer instruction unit 23 also transmits the device authentication ticket. This enables the information processing system 10 to confirm that the image forming apparatus 20 has been authenticated.

Then, the transfer instruction unit 23 of the operation device 22 transmits a signal requesting transfer history information to the information processing system 10 (step S506). The data transfer unit 11 of the information processing system 10 transmits transfer history information stored in the storage unit 15 to the image forming apparatus 20 (step S507).

Figure 21:
FIG. 21 is a diagram illustrating an example of transfer history information.

FIG. 21 is a diagram illustrating an example of transfer history information.

The transfer history information 503 is information indicating the transfer state of data and includes items "job ID", "machine identification number", "facsimile data ID", and "transfer status".

The item "job ID" has a value representing an identifier for identifying a job. The job indicates a data transfer process for which a request has been received by the data transfer unit 11.

The item "machine identification number" has a value representing an identifier for identifying a device (apparatus) that has requested the job. The item "machine identification number" is used to receive requests from a plurality of devices (apparatuses).

The item "facsimile data ID" has a value representing an identifier assigned to each series of pieces of facsimile data received in a single facsimile reception operation and configured to identify each individual piece of facsimile data.

The item "transfer status" has a value indicating the progress of data transfer. Specifically, the item "transfer status" has any one of the values "accepted", "processing", "completed", and "error".

In response to receipt of facsimile data from the image forming apparatus 20, the data transfer unit 11 sets the value of the item "transfer status" to "accepted" and registers a record indicating a job in the transfer history information 503. The value "accepted" is a status indicating that data transfer has been accepted.

When the transfer of the data to the cloud storage 4 is started, the data transfer unit 11 updates the value of the item "transfer status" to "processing". The value "processing" is a status indicating the data transfer process is being executed.

When the transfer of the data to the cloud storage 4 is completed, the data transfer unit 11 updates the value of the item "transfer status" to "completed". The value "completed" is a status indicating that the data transfer process is completed.

If a fault occurs in the transfer of the data to the cloud storage 4, the data transfer unit 11 updates the value of the item "transfer status" to "error". The value "error" is a status indicating that a fault has occurred.

When a certain period of time, for example, three months or more, elapses after a record of the transfer history information 503 is registered, the data transfer unit 11 may delete the record.

In the processing of step S507, the data transfer unit 11 extracts a record of the machine identification number corresponding to the device (apparatus) from which the request has been received from within the transfer history information 503, and transmits the extracted record to the image forming apparatus 20.

Referring back to FIG. 20, the transfer instruction unit 23 of the operation device 22 stores the received transfer history information 503 in the RAM 223, and generates non-transmission-target information based on the stored transfer history information 503 (step S508). The non-transmission-target information is information indicating facsimile data not to be subjected to the retransmission process.

FIG. 22 is a diagram illustrating an example of non-transmission-target information.

The transfer instruction unit 23 extracts a record whose transfer status is set to "accepted", "processing", or "completed" from within the received transfer history information 503, and stores the extracted record in the RAM 223 as non-transmission-target information 504.

The facsimile data associated with records of these transfer statuses has already been transferred or is scheduled to be transferred in a future data transfer process, and thus is set as facsimile data not to be subjected to the retransmission process.

Referring back to FIG. 20, the transfer instruction unit 23 of the operation device 22 transmits a signal requesting the accumulated information 261 to the main body 21 (step S509). The main body 21 extracts the accumulated information 261 from the storage unit 26, and transmits the extracted accumulated information 261 to the operation device 22 (step S510).

Then, the transfer instruction unit 23 of the operation device 22 stores the received accumulated information 261 in the RAM 223, and generates data-within-transmission-period information based on the accumulated information 261 (step S511). The data-within-transmission-period information is information indicating facsimile data within the transmission period of the retransmission process.

Figure 23:
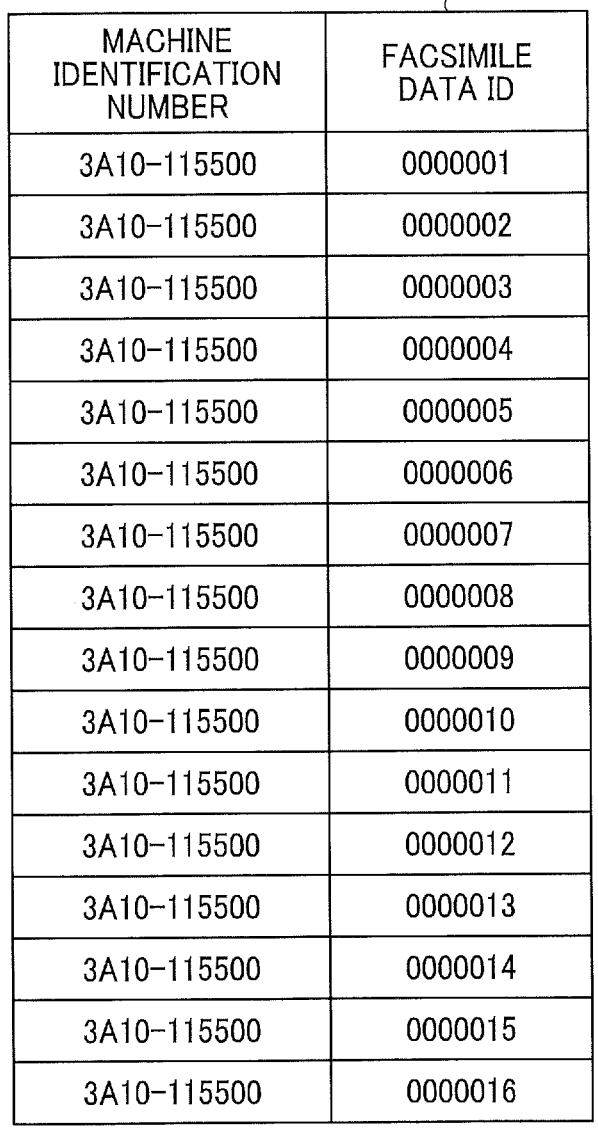
FIG. 23 is a diagram illustrating an example of data-within-transmission-period information.

FIG. 23 is a diagram illustrating an example of data-within-transmission-period information.

The transfer instruction unit 23 extracts a record of facsimile data received in a predetermined transmission period, for example, 14 days, from within the accumulated information 261, and sets the extracted record as data-within-transmission-period information 505.

Referring back to FIG. 20, then, the transfer instruction unit 23 of the operation device 22 generates transmission-target information and stores the transmission-target information in the RAM 223 (step S512). The transmission-target information is information indicating facsimile data to be subjected to the retransmission process. That is, the transfer instruction unit 23 generates transmission-target information based on the acquired transfer history information 503 to identify the facsimile data to be retransmitted from within the facsimile data stored in the storage unit 26 in accordance with the transmission-target information. Accordingly, the identified facsimile data can be retransmitted to the information processing system 10.

FIG. 24 is a diagram illustrating an example of transmission-target information.

Specifically, the transfer instruction unit 23 removes the facsimile data in the non-transmission-target information 504 stored in the RAM 223 from the data-within-transmission-period information 505 stored in the RAM 223, and stores the remaining facsimile data in the RAM 223 as transmission-target information 506. For example, the data-within-transmission-period information 505 includes records of facsimile data IDs "0000001" to "0000016", and the non-transmission-target information 504 includes the records of the facsimile data IDs "0000001" to "0000008", "0000010", "0000011", "0000013", and "0000014". In this case, the transmission-target information 506 includes the records of the facsimile data IDs "0000009", "0000012", "0000015", and "0000016".

Referring back to FIG. 20, then, the transfer instruction unit 23 of the operation device 22 transmits a signal requesting facsimile data included in the transmission-target information 506 stored in the RAM 223 to the main body 21 (step S513).

If the transmission-target information 506 includes a plurality of pieces of facsimile data, the data transfer system 1 repeatedly executes the processing of steps S513 to S523 on each piece of facsimile data.

The main body 21 transmits facsimile data to the operation device 22 (step S514).

The transfer instruction unit 23 of the operation device 22 transmits facsimile data to the information processing system 10 (step S515). The data transfer unit 11 of the information processing system 10 registers a record whose transfer status is set to "accepted" in the transfer history information 503, that is, stores the record in the storage unit 15. Then, the data transfer unit 11 transmits a signal requesting license authentication to the license authentication unit 14 (step S516).

The license authentication unit 14 executes license authentication (step S517). Specifically, the license authentication unit 14 identifies a machine identification number based on the device authentication ticket, and determines whether the license of the tenant corresponding to the machine identification number is assigned the device corresponding to the machine identification number. As a result, the license authentication unit 14 can determine whether the data transfer function is enabled.

The license authentication unit 14 may determine whether the corresponding license is within the validity period.

When the license authentication is successful, the license authentication unit 14 transmits a signal indicating successful license authentication to the data transfer unit 11 (step S518).

Then, the data transfer unit 11 transmits a signal requesting the sort setting information 501 to the cloud storage 4 (step S519). Specifically, the signal requesting the sort setting information 501, which is transmitted from the data transfer unit 11, includes the storage destination information of the sort setting information 501 and the storage account information, which are included in the transfer setting information 154.

The storage authentication unit 41 of the cloud storage 4 performs authentication based on the received storage account information. Specifically, the storage authentication unit 41 determines whether to permit reading of data from the setting area 421. When the storage authentication unit 41 determines that the reading is permitted, the cloud storage 4 transmits the sort setting information 501 stored in the setting area 421 to the information processing system 10 (step S520). The data transfer unit 11 updates the transfer status included in the transfer history information 503 stored in the storage unit 15 to "processing", which is a value indicating that the transfer process is in progress.

The data transfer unit 11 of the information processing system 10 transmits the facsimile data to the cloud storage 4 (step S521). Specifically, the data transfer unit 11 sorts the facsimile data to each folder in accordance with the received sort setting information 501, and transmits the facsimile data to the cloud storage 4 together with information designating the folder to which the facsimile data is sorted.

In the case of facsimile data received from a transmission source number not defined in the sort setting information 501, the data transfer unit 11 designates the folder name included in the undefined-data sorting information as the storage location at the sort destination.

The data transfer unit 11 may transmit information designating the file name after the transfer, together with the facsimile data. The file name includes, for example, the transmission source name, the transmission date, and the transmission source number. The transmission source name is the same as the name of the sort-destination folder. The transmission source name may be information included in the metadata of the facsimile data. If facsimile data for which the transmission source number is not defined in the sort setting information 501 is transferred, the transmission source number may be used instead of the transmission source name.

The storage authentication unit 41 of the cloud storage 4 performs authentication based on the received storage account information. Specifically, the storage authentication unit 41 determines whether to permit writing of data to the data storage area 422. When the storage authentication unit 41 determines that the writing is permitted, the cloud storage 4 stores the received facsimile data in a designated folder in the data storage area 422.

Then, the cloud storage 4 transmits a signal indicating successful data transfer to the information processing system 10 (step S522). The data transfer unit 11 updates the transfer status included in the transfer history information 503 stored in the storage unit 15 to "completed", which is a value indicating completion of the transfer.

The data transfer unit 11 transmits a notification mail indicating completion of the transfer and the sort destination of the facsimile data to the mail server 7 (step S523). Specifically, the data transfer unit 11 transmits a notification mail whose destination is set as the value of the item "email address to be notified" in the sort setting information 501. The mail server 7 transmits the received notification mail to a designated destination.

If an error has occurred in any of the processes described above or if a signal indicating that the data transfer has failed is received from the cloud storage 4, the data transfer unit 11 updates the transfer status included in the transfer history information 503 of the job, which is stored in the storage unit 15, to "error", which is a value indicating an error. Then, the data transfer unit 11 transmits a notification mail indicating the occurrence of an error to the email address included in the error notification-destination information.

The data transfer system 1 according to this embodiment can retransmit any facsimile data for which transfer has failed. This increases the reliability of the transfer of facsimile data. For example, in a transaction such as order reception, missing orders, duplicate orders, or other issues can be prevented. The data to be transferred or transmitted is not limited to facsimile data and may be other image data, files, or emails, which can be applied to various data transfer scenes.

In the data transfer process illustrated in FIG. 16, facsimile data that has already been transmitted may be retransmitted because the facsimile data is subjected to the retransmission process described above. Accordingly, the transfer instruction unit 23 may transfer data after confirming that the data is not to be subjected to the retransmission process described above.

Specifically, the transfer instruction unit 23 of the operation device 22 executes the following process before the processing of step S401 of the data transfer process.

The transfer instruction unit 23 transmits a signal requesting the transfer history information 503 to the information processing system 10. The data transfer unit 11 of the information processing system 10 transmits the transfer history information 503 to the image forming apparatus 20. The transfer instruction unit 23 stores the received transfer history information 503 in the RAM 223, extracts a record whose transfer status is set to "accepted", "processing", or "completed" from within the transfer history information 503, and stores the extracted record in the RAM 223.

Then, the transfer instruction unit 23 compares the information stored in the RAM 223 to determine whether the facsimile data to be transferred is included in the extracted record. If the transfer instruction unit 23 determines that the facsimile data to be transferred is included in the extracted record, the transfer instruction unit 23 ends the data transfer process because the facsimile data has already been transmitted.

If the transfer instruction unit 23 determines that the facsimile data to be transferred is not included in the extracted record, the transfer instruction unit 23 executes the processing of step S401 and the subsequent processing.

Accordingly, after facsimile data that has just been registered in the accumulated information 261 of the image forming apparatus 20 and is not registered in the transfer history information 503 of the information processing system 10 is transmitted from the transfer instruction unit 23 in the data transfer process, the same facsimile data can be prevented from being retransmitted in the data retransmission process. This can reduce the risk of double transmission of facsimile data.

The data transfer system 1 according to this embodiment may not transfer specific facsimile data. For example, facsimile data whose content can be accessed by receiving an input of a personal identification number to the image forming apparatus 20 may potentially be accessed, when transferred, without the input of the personal identification number and thus may not be transferred.

Second Embodiment

A second embodiment will be described with reference to the drawings. The second embodiment is different from the first embodiment in that a process for deleting facsimile data accumulated in the image forming apparatus 20 is executed. In the following description of the second embodiment, differences from the first embodiment will be described, and components having functional configurations similar to those of the first embodiment are denoted by the same reference numerals as those used in the description of the first embodiment and will not be described.

FIG. 25 is a diagram illustrating an example of queue information according to the second embodiment.

The transfer instruction unit 23 according to this embodiment registers a data deletion process in queue information 507 periodically, for example, every day. At the time of registration in the queue information 507, the transfer instruction unit 23 does not determine facsimile data to be deleted. Thus, the value of the item "facsimile data ID" is not registered for a record to be subjected to the data deletion process in the queue information 507.

Next, the operation of the data deletion process will be described with reference to the drawings.

Figure 26:
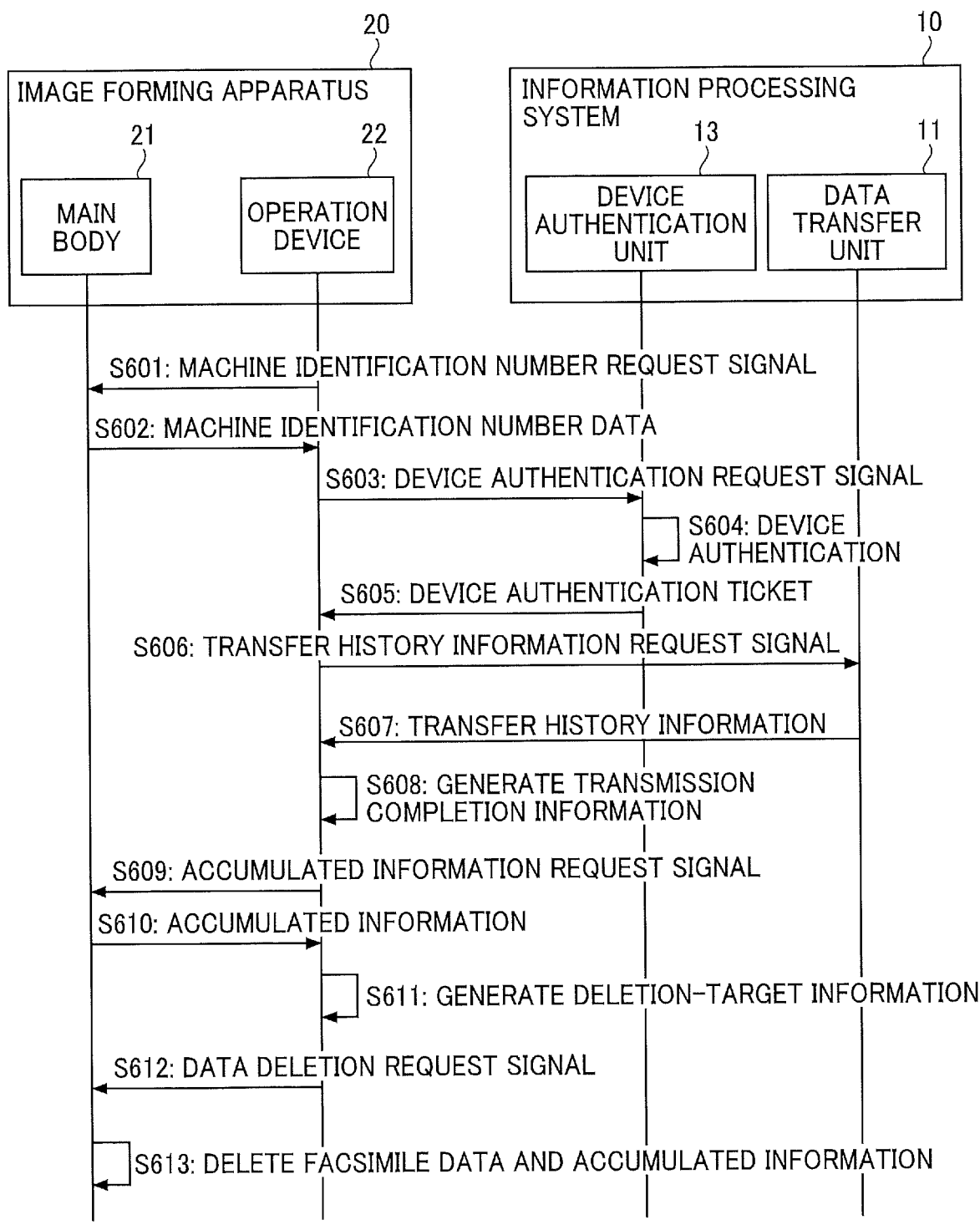
FIG. 26 is a diagram illustrating an example sequence of a data deletion process according to the second embodiment.

FIG. 26 is a diagram illustrating an example sequence of a data deletion process according to the second embodiment.

The transfer instruction unit 23 of the operation device 22 according to this embodiment executes processes registered in the queue information 507 according to the order of registration. At the turn for a data deletion process, the transfer instruction unit 23 starts the data deletion process.

When the data deletion process is started, the transfer instruction unit 23 transmits a signal requesting the machine identification number of the image forming apparatus 20 to the main body 21 (step S601). The main body 21 transmits data indicating the machine identification number to the operation device 22 and stores the data in the RAM 223 (step S602).

Then, the transfer instruction unit 23 of the operation device 22 transmits a signal requesting device authentication to the information processing system 10 (step S603). The device authentication unit 13 of the information processing system 10 performs device authentication (step S604). When the device authentication is successful, the device authentication unit 13 issues a device authentication ticket and transmits the device authentication ticket to the image forming apparatus 20 (step S605).

In the subsequent processing, when transmitting a signal requesting a process to the information processing system 10, the transfer instruction unit 23 also transmits the device authentication ticket. This enables the information processing system 10 to confirm that the image forming apparatus 20 has been authenticated.

Then, the transfer instruction unit 23 of the operation device 22 transmits a signal requesting the transfer history information 503 to the information processing system 10 (step S606). The data transfer unit 11 of the information processing system 10 transmits the transfer history information 503 to the image forming apparatus 20, and the transfer history information 503 is stored in the RAM 223 (step S607).

The transfer instruction unit 23 of the operation device 22 generates transmission completion information based on the received transfer history information 503 and stores the transmission completion information in the RAM 223 (step S608).

Figure 27:
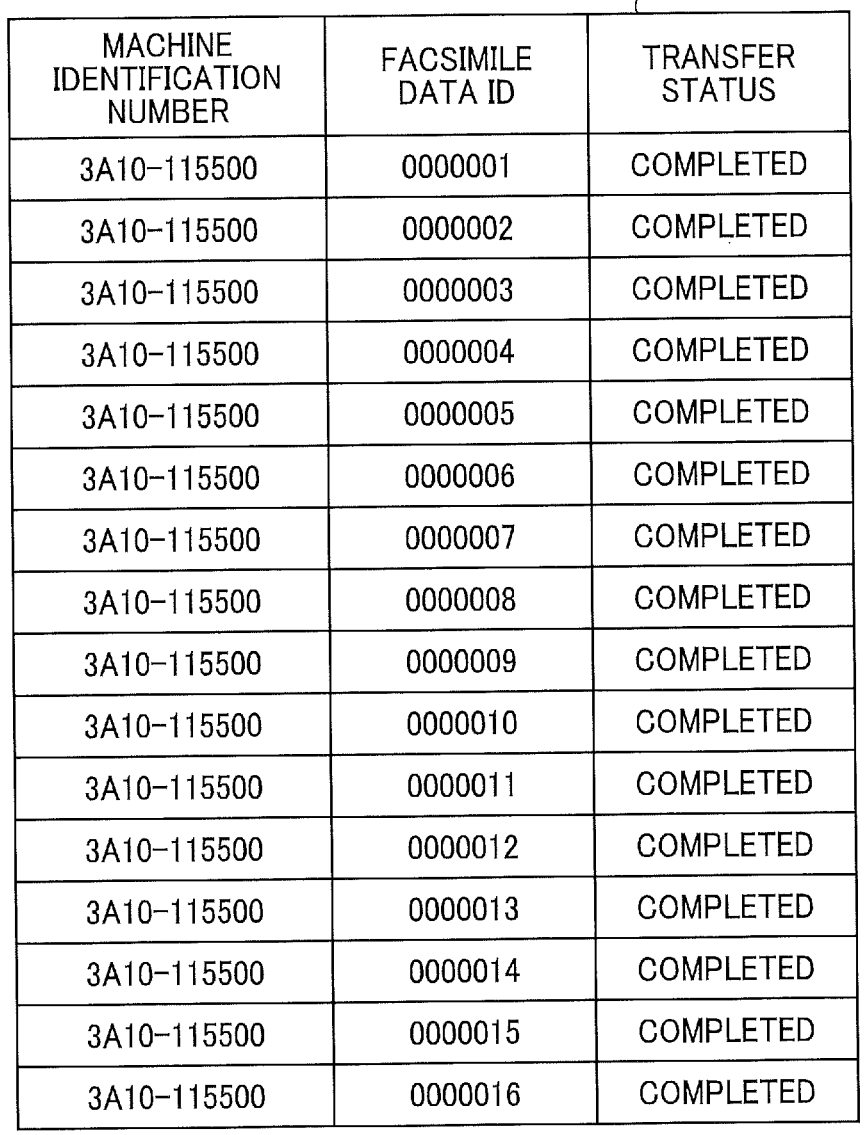
FIG. 27 is a diagram illustrating an example of transmission completion information according to the second embodiment.

FIG. 27 is a diagram illustrating an example of transmission completion information according to the second embodiment.

The transfer instruction unit 23 extracts a record whose transfer status is set to "completed" from within the received transfer history information 503 and stores the extracted record in the RAM 223 as transmission completion information 508.

Referring back to FIG. 26, the transfer instruction unit 23 of the operation device 22 transmits a signal requesting accumulated information to the main body 21 (step S609).

FIG. 28 is a diagram illustrating an example of accumulated information according to the second embodiment.

Accumulated information 509 includes a record that was not to be deleted because the transfer status thereof in the transfer history information 503 was not "completed" in the previous data deletion process, for example, the facsimile data ID "0000009", and a record that was not registered in the previous data deletion process, for example, the facsimile data ID "0000012". When facsimile data for which the transmission source number (fax number) is withheld and the field for the transmission source number is blank in the accumulated information such as the accumulated information 509 illustrated in FIG. 28 is transferred from the information processing system 10 to the cloud storage 4, the transferred facsimile data is sorted to an undefined-data storage-destination folder in the cloud storage 4 in accordance with the undefined-data sorting information.

Referring back to FIG. 26, the main body 21 extracts the accumulated information 509 from the storage unit 26 and transmits the extracted accumulated information 509 to the operation device 22 (step S610).

Then, the transfer instruction unit 23 of the operation device 22 generates deletion-target information based on the received accumulated information 509 (step S611). The deletion-target information is information indicating facsimile data to be subjected to the data deletion process.

FIG. 29 is a diagram illustrating an example of deletion-target information according to the second embodiment.

The transfer instruction unit 23 stores a record indicating transmitted facsimile data included in the transmission completion information 508 among the records in the accumulated information 509 in the storage unit 26 as deletion-target information 510.

Referring back to FIG. 26, the transfer instruction unit 23 transmits a data deletion request signal including the deletion-target information 510 to the main body 21 (step S612).

The main body 21 deletes the facsimile data indicated by the deletion-target information 510 and the corresponding record in the accumulated information 509 (step S613).

The data transfer system 1 according to this embodiment can delete data for which transfer has succeeded from within the facsimile data accumulated in the image forming apparatus 20. Therefore, it is possible to appropriately delete received data and suppress an increase in the used amount of the storage unit 26.

In various processes in which a machine identification number is transmitted, the transfer instruction unit 23 may receive, instead of a machine identification number, an authentication ticket associated with the machine identification number from the information processing system 10, and transmit the received authentication ticket to the main body 21.

Third Embodiment

A third embodiment will be described with reference to the drawings. The third embodiment is different from the second embodiment mainly in that the third embodiment includes a detailed description of execution of a transfer job by the information processing system 10. In the following description of the third embodiment, differences from the second embodiment will be described, and components having functional configurations similar to those of the second embodiment are denoted by the same reference numerals as those used in the description of the second embodiment and will not be described.

Figure 30:
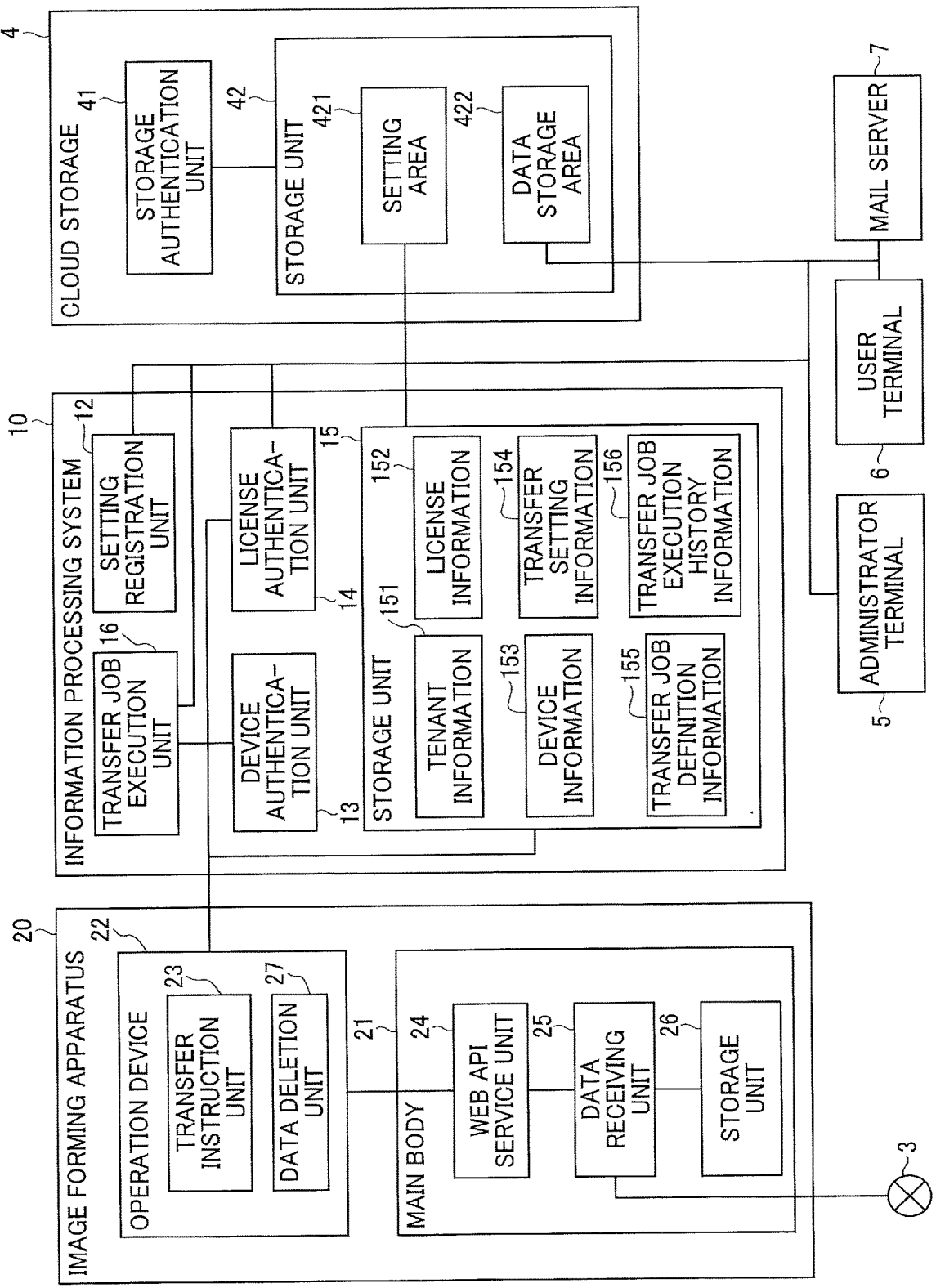
FIG. 30 is a diagram illustrating example functions of an information processing system and an image forming apparatus according to a third embodiment.

FIG. 30 is a diagram illustrating example functions of an information processing system and an image forming apparatus according to the third embodiment.

The information processing system 10 according to this embodiment has a configuration in which a transfer job execution unit 16 is additionally included in place of the data transfer unit 11 of the information processing system 10 according to the first and second embodiments.

The transfer job execution unit 16 transfers facsimile data. Specifically, the transfer job execution unit 16 executes a data transfer application (such as a facsimile transfer application), namely, a process (hereinafter also referred to as a transfer job) specified in transfer job definition information 155 stored in the storage unit 15. The transfer job execution unit 16 acquires sort setting information stored in the setting area 421 of the storage unit 42 of the cloud storage 4. Then, the transfer job execution unit 16 sorts received facsimile data to each folder in accordance with the sort setting information, and transmits the facsimile data to the data storage area 422 of the storage unit 42 of the cloud storage 4.

The storage unit 15 stores the transfer job definition information 155 and transfer job execution history information 156 instead of the transfer history information 503 according to the first and second embodiments.

The transfer job definition information 155 defines, for each component, a process included in each transfer job. For example, a process for acquiring sort setting information, a process for transferring data to the cloud storage 4, or a process for notifying a user of information related to transfer, and other processes are specified on a component-by-component basis, and the order of executing the processes is further specified.

The transfer job execution history information 156 is information indicating a history of execution of the transfer job. Specifically, in response to receipt of an instruction for executing a transfer job from the image forming apparatus 20, the information processing system 10 adds a record to the transfer job execution history information 156 and updates the record in accordance with the execution state of the process thereafter. A specific example of the transfer job execution history information 156 will be described below.

The image forming apparatus 20 according to this embodiment has a configuration in which a data deletion unit 27 is added to the operation device 22 of the image forming apparatus 20 according to the first and second embodiments.

When the data deletion function is enabled, the data deletion unit 27 executes a process for deleting the facsimile data stored in the storage unit 26, periodically, for example, every day. Specifically, the data deletion unit 27 registers a data deletion process in the queue information.

Next, the operation of the data transfer system 1 according to this embodiment will be described with reference to the drawings.

Figure 31:
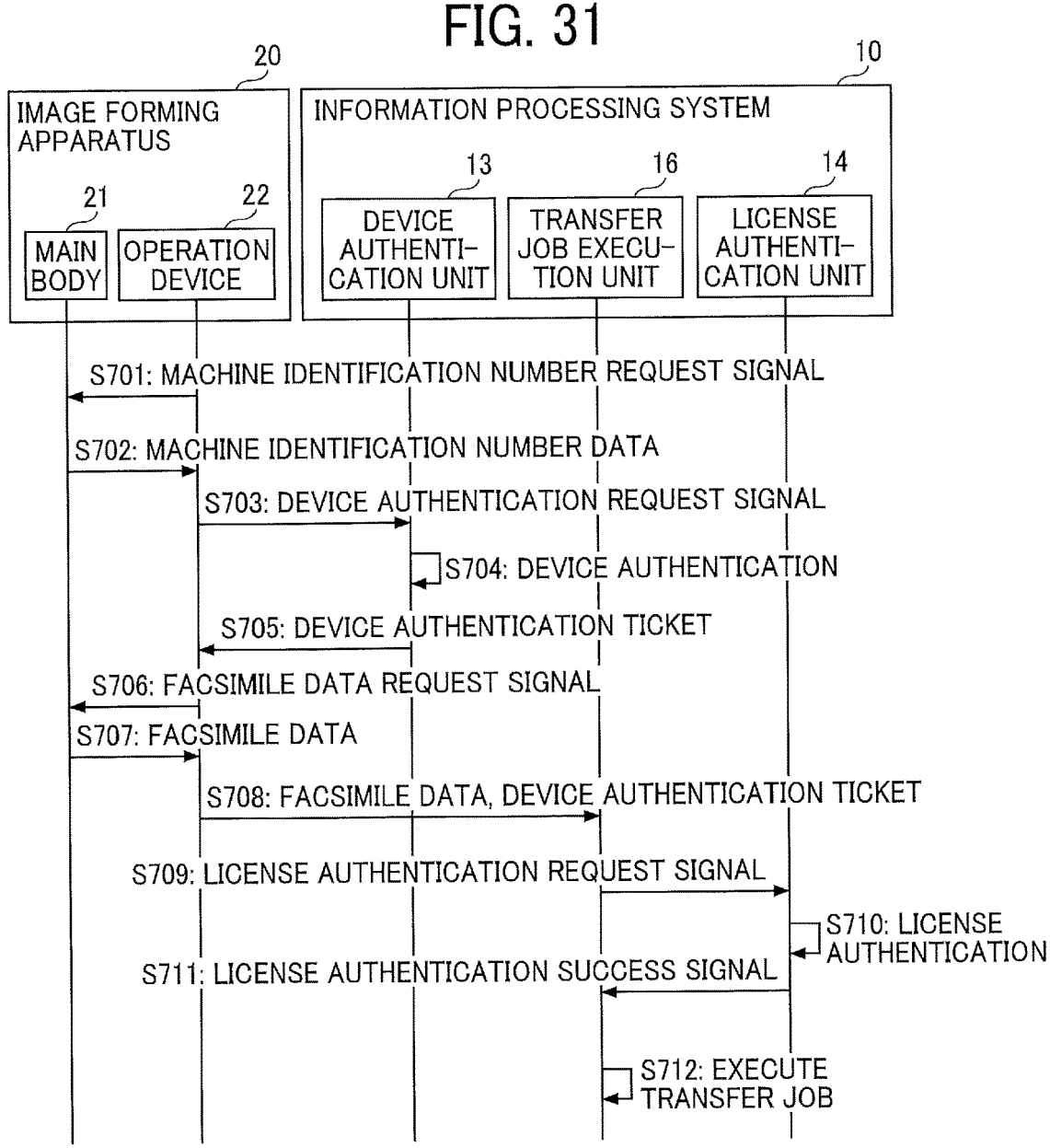
FIG. 31 is a diagram illustrating an example sequence of a data transfer process according to the third embodiment.

FIG. 31 is a diagram illustrating an example sequence of a data transfer process according to the third embodiment.

The processing of steps S701 to S711 of the data transfer process according to this embodiment is similar to the processing of steps S401 to S411 of the data transfer process according to the first embodiment illustrated in FIG. 16. Note that the data transfer unit 11 according to the first embodiment is replaced with the transfer job execution unit 16 in this embodiment.

After the processing of step S711, the transfer job execution unit 16 executes the transfer job specified in the transfer job definition information 155 (step S712). The sequence of the transfer job will be described below.

Figure 32:
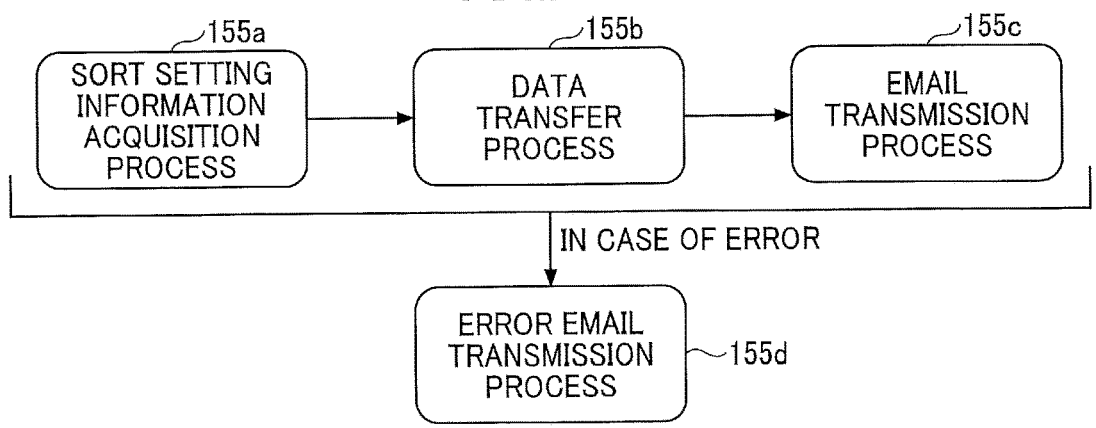
FIG. 32 is a diagram illustrating an example of transfer job definition information according to the third embodiment.

FIG. 32 is a diagram illustrating an example of transfer job definition information according to the third embodiment.

The transfer job definition information 155 is information defining a series of processes as a workflow including a plurality of components. For example, the transfer job definition information 155 includes, as components, a sort setting information acquisition process 155a, a data transfer process 155b, an email transmission process 155c, and an error email transmission process 155d.

The transfer job definition information 155 also includes information specifying the processing order of the components and the processing start condition of each of the components. For example, the transfer job definition information 155 specifies that the sort setting information acquisition process 155a is first executed, the data transfer process 155b is executed after the completion of the sort setting information acquisition process 155a, and the email transmission process 155c is then executed after the completion of the data transfer process 155b.

The transfer job definition information 155 also specifies that the error email transmission process 155d is executed in a case where an error occurs in any of the sort setting information acquisition process 155a, the data transfer process 155b, and the email transmission process 155c.

Each component specifies how information used to execute the process of the component, such as the source from which the information is acquired, or the transmission destination of data, is acquired.

The transfer job definition information 155 may include other components. For example, the transfer job definition information 155 may include components such as a process for acquiring setting information, a process for modifying an image of facsimile data (such as removing a blank sheet and correcting top and bottom), and a process for generating a folder in the cloud storage 4 as the transmission destination.

The transfer job defined in the transfer job definition information 155 described above indicates a series of processes including a first process for transferring data, and a second process related to the first process. The data transfer process 155b is an example of the first process, and the email transmission process 155c is an example of the second process.

FIG. 33 is a diagram illustrating a transfer status according to the third embodiment.

The transfer job execution unit 16 updates the value of the transfer status included in the transfer job execution history information 156 in accordance with the execution state of the transfer job.

Specifically, the transfer job execution unit 16 stores the transfer status as "accepted" when the execution of the job is accepted and the component of the data transfer process 155b has not started the process, such as for transfer job execution states A and B illustrated in FIG. 33. The transfer status "accepted" is a value indicating that the transfer job execution unit 16 has accepted a transfer instruction.

When the component of the data transfer process 155b is executing the process, such as for a transfer job execution state C illustrated in FIG. 33, the transfer job execution unit 16 updates the transfer status to "processing". The transfer status "processing" is a value indicating that data transfer is being executed.

When the component of the data transfer process 155b has normally completed the process, such as for transfer job execution states D, E and G illustrated in FIG. 33, the transfer job execution unit 16 updates the transfer status to "completed". The transfer status "completed" is a value indicating that data transfer has been completed normally.

When an error occurs in the process performed by the component of the data transfer process 155b, such as for a transfer job execution state F illustrated in FIG. 33, the transfer job execution unit 16 updates the transfer status to "error". The transfer status "error" is a value indicating that data transfer has been terminated abnormally.

As described above, records having the transfer statuses "completed" and "error" do not change over time because the respective processes have been terminated. In contrast, the transfer statuses "accepted" and "processing" are temporary statuses. That is, records having the transfer statuses "accepted" and "processing" change to the transfer status "completed" or "error" over time.

FIG. 34 is a diagram illustrating an example sequence of a transfer job execution process according to the third embodiment.

When the processing of step S712 illustrated in FIG. 31 is started, the transfer job execution unit 16 executes the transfer job execution process illustrated in FIG. 34. First, the transfer job execution unit 16 adds a record of the facsimile data to the transfer job execution history information 156 in the storage unit 15. Specifically, the transfer job execution unit 16 adds a record having the transfer status "accepted" to the transfer job execution history information 156.

Then, the transfer job execution unit 16 executes the sort setting information acquisition process 155a. That is, as in step S412 of the data transfer process according to the first embodiment illustrated in FIG. 16, the transfer job execution unit 16 transmits a signal requesting the sort setting information 501 to the cloud storage 4 (step S801).

As in step S413 of the data transfer process according to the first embodiment illustrated in FIG. 16, the cloud storage 4 transmits the sort setting information 501 to the information processing system 10 (step S802).

The transfer job execution unit 16 of the information processing system 10 executes the data transfer process 155b. That is, the transfer job execution unit 16 transmits the facsimile data to the cloud storage 4 (step S803).

When the data transfer process 155b is started, the transfer job execution unit 16 updates the transfer status included in the transfer job execution history information 156 stored in the storage unit 15 to "processing". Then, the transfer job execution unit 16 sorts the facsimile data to each folder in accordance with the received sort setting information 501, and transmits the facsimile data to the cloud storage 4 together with information designating the folder to which the facsimile data is sorted.

As in step S415 of the data transfer process according to the first embodiment illustrated in FIG. 16, the cloud storage 4 stores the received facsimile data in a designated folder in the data storage area 422.

Then, the cloud storage 4 transmits a signal indicating successful data transfer (transfer success signal) to the information processing system 10 (step S804).

In response to receipt of the transfer success signal, the transfer job execution unit 16 updates the transfer status included in the transfer job execution history information 156 stored in the storage unit 15 to "completed". Then, the transfer job execution unit 16 executes the email transmission process 155c. That is, as in step S416 of the data transfer process according to the first embodiment illustrated in FIG. 16, the transfer job execution unit 16 transmits a notification mail indicating completion of the transfer and the sort destination of the facsimile data to the mail server 7 (step S805).

If an error has occurred in the processing of step S803 or S804 described above, the transfer job execution unit 16 updates the transfer status included in the transfer job execution history information 156 stored in the storage unit 15 to "error". If an error has occurred in the each of the processes described above, the transfer job execution unit 16 executes the error email transmission process 155d. That is, the transfer job execution unit 16 transmits a notification mail indicating the occurrence of an error to the email address included in the error notification-destination information.

The notification process in step S805 described above or the notification process in case of an error relates to transmission of an email based on a Simple Mail Transfer Protocol (SMTP) or any other suitable protocol. The email address of the transmission destination of the email is an example of a notification destination associated with the data. The notification process may be any other process for notifying a user of information related to data transfer. For example, the notification process may be a process for performing notification via telephone, short message service (SMS), facsimile, or social network service (SNS). Alternatively, the information related to data transfer may be displayed as a pop-up dialog or a banner on the screen of the administrator terminal 5, the user terminal 6, or the image forming apparatus 20. In addition, the data transfer system 1 may notify another server, a cloud service, or the like of the information related to data transfer via an API, or may execute a plurality of processes thereof.

Figure 35:
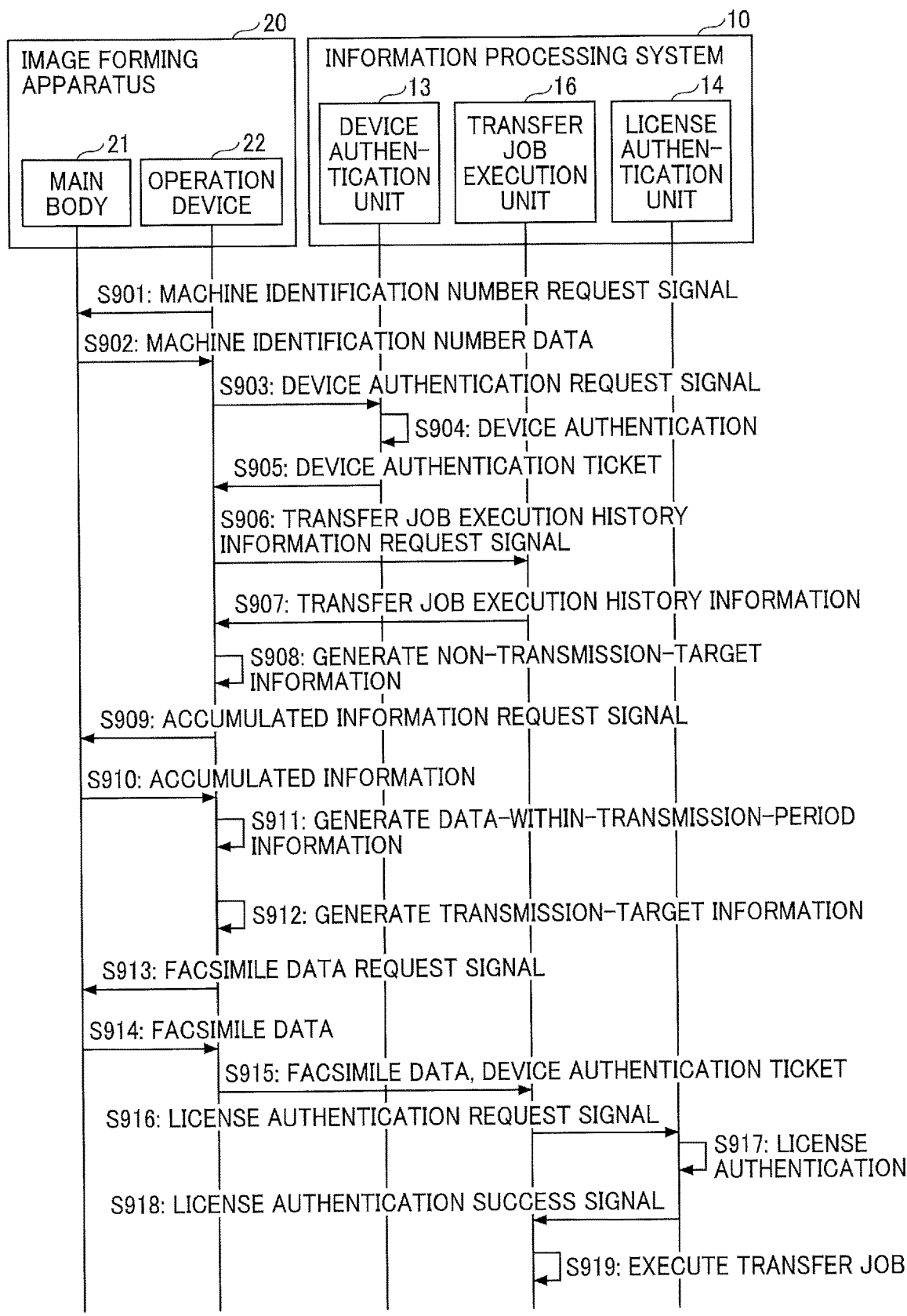
FIG. 35 is a diagram illustrating an example sequence of a retransmission process according to the third embodiment.

FIG. 35 is a diagram illustrating an example sequence of a retransmission process according to the third embodiment.

The transfer instruction unit 23 of the operation device 22 executes processes registered in the queue information 502 according to the order of registration. At the turn for a retransmission process, the transfer instruction unit 23 starts the retransmission process illustrated in FIG. 35.

The processing of steps S901 to S907 of the retransmission process according to this embodiment is similar to the processing of steps S501 to S507 of the retransmission process according to the first embodiment illustrated in FIG. 20. Note that the transfer job execution unit 16 according to this embodiment transmits the transfer job execution history information 156 instead of the transfer history information 503 according to the first embodiment.

FIG. 36 is a diagram illustrating an example of transfer job execution history information according to the third embodiment.

The transfer job execution history information 156 is information indicating a history of execution of a transfer job and includes items "job ID", "machine identification number", "facsimile data ID", and "transfer status".

The item "job ID" has a value representing an identifier for identifying a transfer job. Each time a transfer job is started, the transfer job execution unit 16 assigns a job ID to the transfer job.

The item "machine identification number" has a value representing an identifier for identifying a device (apparatus) that has requested the job. The item "machine identification number" is used to receive requests from a plurality of devices (apparatuses).

The item "facsimile data ID" has a value representing an identifier assigned to a series of pieces of facsimile data received in a single facsimile reception operation and configured to identify each individual piece of facsimile data.

The item "transfer status" has a value indicating the execution state of the transfer job. Specifically, the item "transfer status" has any one of the values "accepted", "processing", "completed", and "error".

The transfer job execution history information 156 is an example of transfer history information indicating the transfer state of data.

When a certain period of time, for example, three months or more, elapses after a record is registered in the transfer job execution history information 156, the transfer job execution unit 16 may delete the record.

In the processing of step S907 illustrated in FIG. 35, the transfer job execution unit 16 extracts the record of the machine identification number corresponding to the device from which the request has been received from within the transfer job execution history information 156, and transmits the extracted record to the image forming apparatus 20.

Referring back to FIG. 35, the processing of steps S908 to S918 of the retransmission process according to this embodiment illustrated in FIG. 20 is similar to the processing of steps S508 to S518 of the retransmission process according to the first embodiment. Note that the transfer instruction unit 23 of the operation device 22 according to this embodiment executes the respective processes in accordance with the transfer job execution history information 156, instead of the transfer history information 503 according to the first embodiment. Furthermore, in this embodiment, the data transfer unit 11 according to the first embodiment is replaced with the transfer job execution unit 16.

After the processing of step S918, the transfer job execution unit 16 executes the transfer job specified in the transfer job definition information 155 (step S919).

Next, the data deletion process according to this embodiment will be described.

The data deletion function of the image forming apparatus 20 is disabled in the initial state or immediately after the data deletion application is installed. The tenant administrator 9 performs the operation of enabling the data deletion function on a screen for operating the operation device 22. Specifically, if the data transfer function illustrated in FIG. 5 is enabled, the operation device 22 displays a data deletion function setting input screen in response to an operation by the tenant administrator 9.

Figure 37:
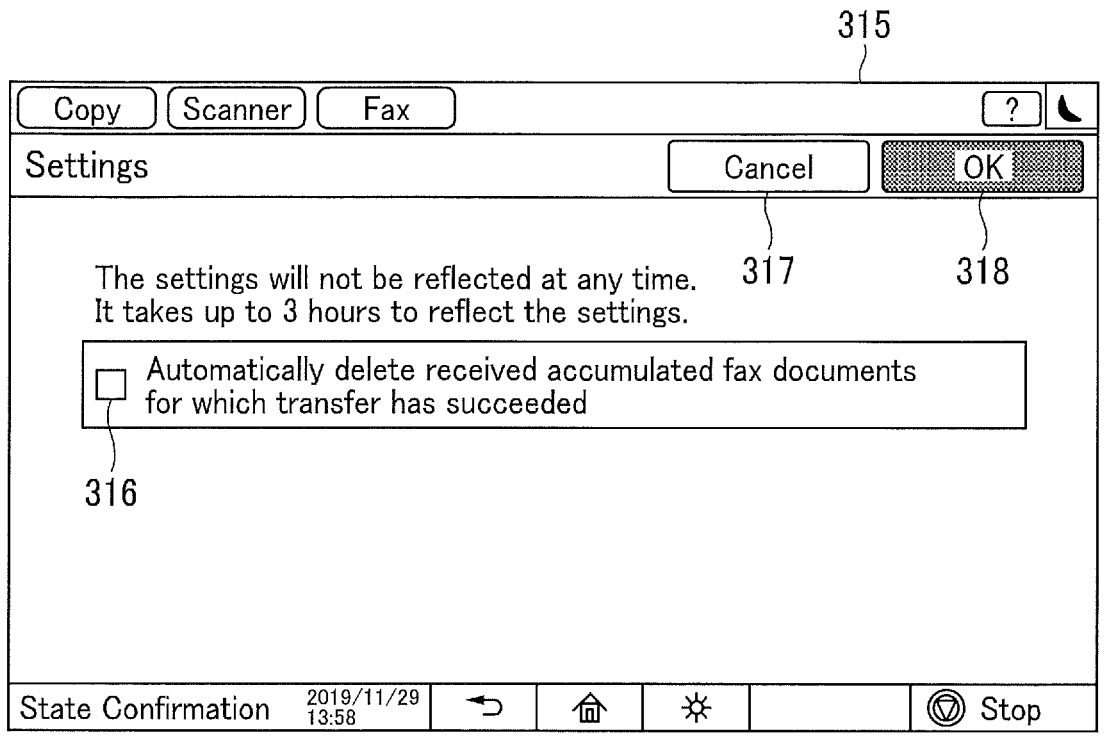
FIG. 37 is a diagram illustrating an example of a data deletion function setting input screen according to the third embodiment.

FIG. 37 is a diagram illustrating an example of a data deletion function setting input screen according to the third embodiment.

A data deletion function setting input screen 315 includes an enabling checkbox 316, a cancel button 317, and an OK button 318.

The enabling checkbox 316 is a GUI for selecting whether to enable the data deletion function.

The cancel button 317 is a button for canceling the setting of the data deletion function. In response to pressing of the cancel button 317, the operation device 22 ends the process without changing the settings.

The OK button 318 is a button for registering the settings of the data deletion function. In response to pressing of the OK button 318, the operation device 22 stores information indicating the selected content of the enabling checkbox 316 and displays a data deletion function setting confirmation screen.

If the backup setting is not enabled, the operation device 22 may prohibit the data deletion function from being enabled on the data deletion function setting input screen. The backup setting is a setting for transferring data for backup. Specifically, when the backup setting is enabled, the image forming apparatus 20 transfers data to a set email address or to a set folder or the like in a predetermined personal computer (PC).

For example, when displaying the data deletion function setting input screen, the operation device 22 may determine whether the backup setting is enabled. In this case, if the operation device 22 determines that the backup setting is not enabled, the enabling checkbox 316 may be grayed out.

The operation device 22 may determine whether the backup setting is enabled in response to pressing of the OK button 318 in a state where the enabling checkbox 316 is checked. In this case, if the operation device 22 determines that the backup setting is not enabled, the operation device 22 may display a warning and may not accept the setting for enabling the data deletion function.

Figure 38:
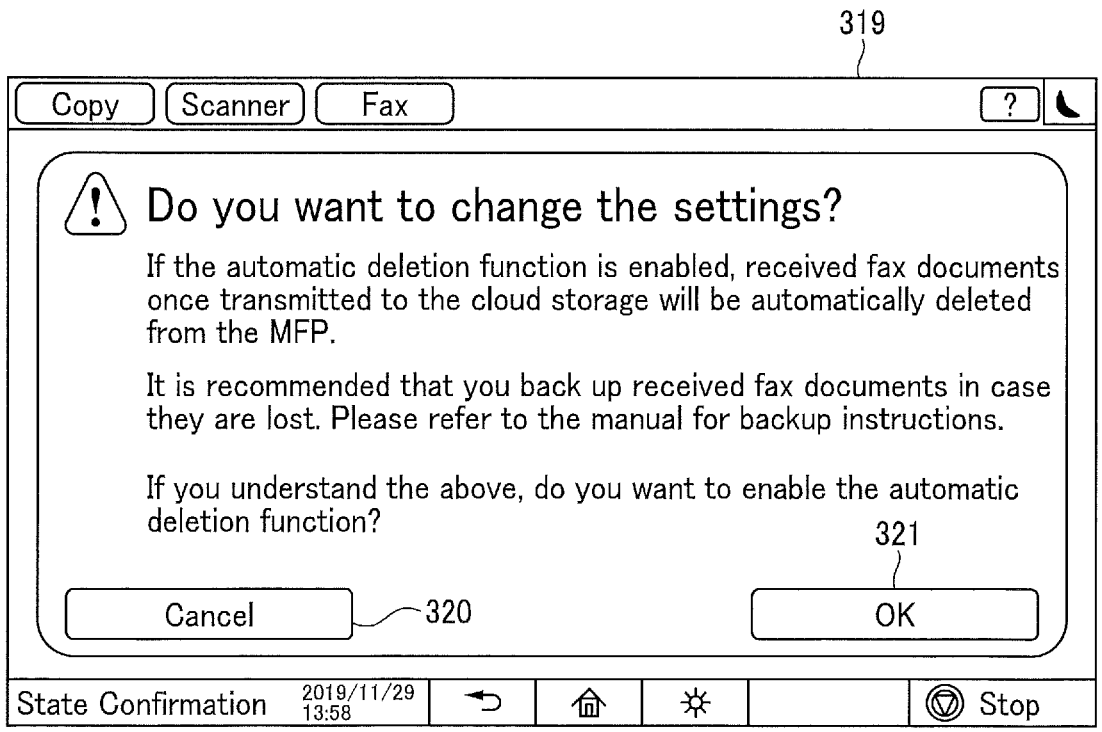
FIG. 38 is a diagram illustrating an example of a data deletion function setting confirmation screen according to the third embodiment.

FIG. 38 is a diagram illustrating an example of a data deletion function setting confirmation screen according to the third embodiment.

A data deletion function setting confirmation screen 319 includes a cancel button 320 and an OK button 321.

The cancel button 320 is a button for canceling the setting of the data deletion function. In response to pressing of the cancel button 320, the operation device 22 ends the process without changing the settings.

The OK button 321 is a button for registering the settings of the data deletion function. In response to pressing of the OK button 321, the operation device 22 updates the setting information stored in the data deletion unit 27 in accordance with the information indicating the selected content of the enabling checkbox 316, which is stored in the storage unit 26.

The setting information stored in the data deletion unit 27 includes information indicating that the data deletion function is enabled or disabled, and information indicating the date and time when the data deletion function was enabled.

The data deletion function setting confirmation screen 319 may include a message that prompts backup of data.

Next, the operation of the data deletion process will be described with reference to the drawings.

The operation device 22 executes processes registered in the queue information 502 according to the order of registration. At the turn for a data deletion process, the data deletion unit 27 starts the data deletion process illustrated in FIG. 39.

Figure 39:
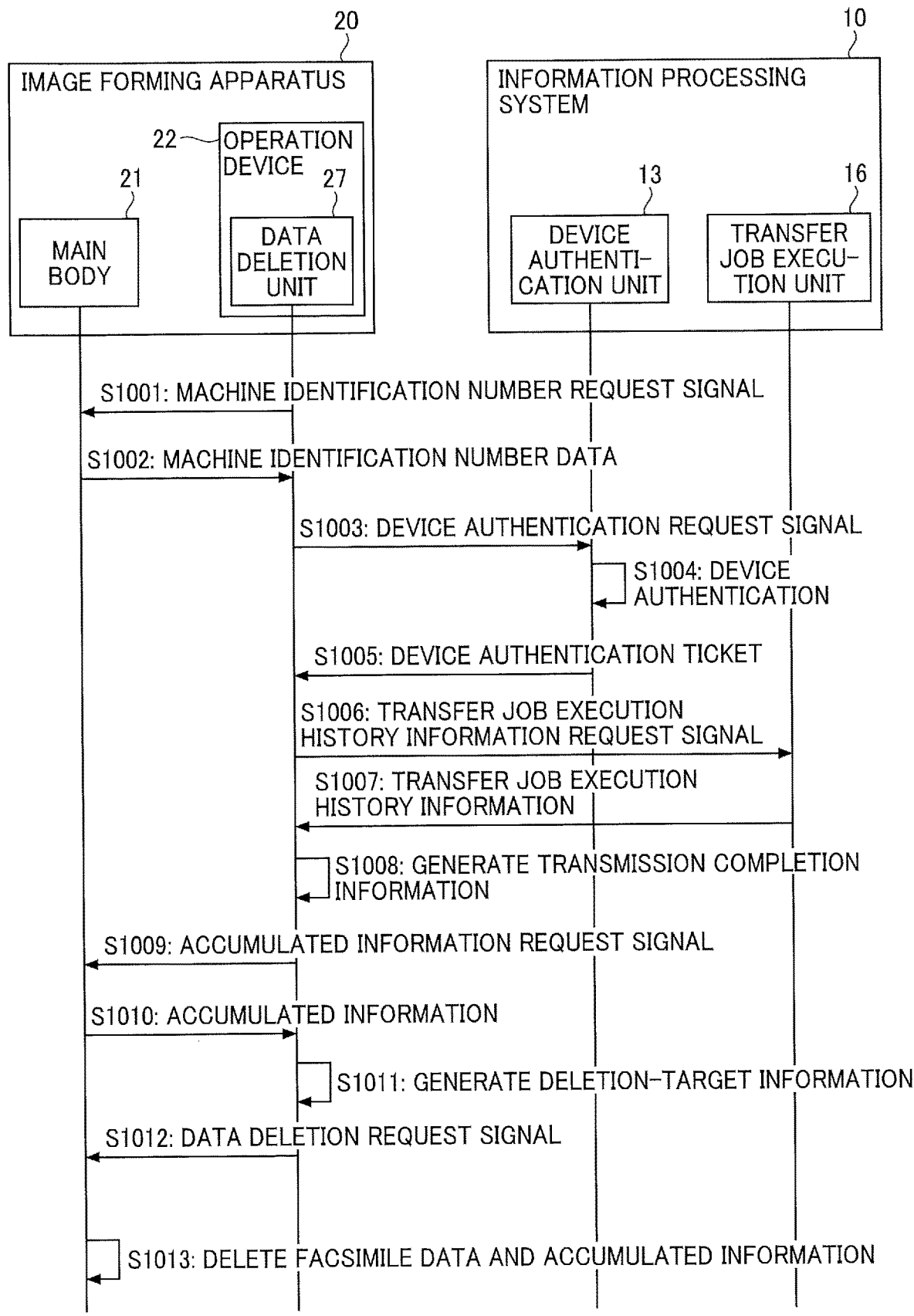
FIG. 39 is a diagram illustrating an example sequence of a data deletion process according to the third embodiment.

FIG. 39 is a diagram illustrating an example sequence of a data deletion process according to the third embodiment.

The processing of steps S1001 to S1013 of data deletion process according to this embodiment is similar to the processing of steps S601 to S613 of the data deletion process according to the second embodiment illustrated in FIG. 26. Note that the transfer instruction unit 23 according to the second embodiment is replaced with the data deletion unit 27 in this embodiment. The data deletion unit 27 executes the respective processes in accordance with the transfer job execution history information 156, instead of the transfer history information 503 according to the second embodiment.

In the processing of step S1011, the data deletion unit 27 may set facsimile data received before the data deletion function is enabled among the records in the accumulated information 509 as an object not to be deleted. Specifically, the data deletion unit 27 acquires information indicating the date and time (A) when the data deletion function was enabled from the stored setting information, and compares the date and time (A) with the date and time (B) of reception (reception time) included in the accumulated information 509. Then, the data deletion unit 27 extracts, from the accumulated information 509, a record satisfying A<B (the date and time (B) is later than the date and time (A)) and included in the transmission completion information 508.

A record may be extracted from the accumulated information 509 in accordance with any other date and time condition. For example, the data deletion unit 27 may store the date and time when the data deletion application was installed, the date and time when the contract became effective, or the like, and extract a record of facsimile data received after the stored date and time.

In the data transfer system 1 according to this embodiment, the information processing system 10 deletes data in response to receipt of a signal indicating successful data transfer from the transfer destination (the cloud storage 4) set in the data transfer process 155b. As a result, only data guaranteed to have been transferred to the transfer destination can be deleted.

The data deletion unit 27 does not delete data received before the data deletion function is enabled. This can prevent unintended, erroneous deletion of data.

In the data transfer system 1 according to this embodiment, data for which the transfer job has succeeded can be deleted from among the pieces of facsimile data accumulated in the image forming apparatus 20. Therefore, it is possible to appropriately delete received data and suppress an increase in the used amount of the storage unit 26.

Even if the email transmission process 155c in a transfer job has failed, the transfer status in the transfer job execution history information 156 is set to "completed" when the data transfer process 155b in the transfer job has succeeded. In this case, the data deletion unit 27 deletes the facsimile data associated with the transfer job and the corresponding record in the accumulated information 509.

In other words, when the transfer job execution history information 156 indicates that the first process (the data transfer process 155b) for data has been completed, the data deletion unit 27 deletes the data from the storage unit 26, regardless of whether the execution of the second process (the email transmission process 155c) has been completed. This makes it possible to accurately determine whether a transfer process of the data has been performed.

In a case where the data deletion unit 27 determines that transfer of data has been completed in response to completion of the execution of the second process, the data deletion unit 27 will not delete the data because the second process is not completed even though the transfer of the data has been completed in the first process. This may potentially cause double transmission or the like of the data. In contrast, the data deletion unit 27 according to this embodiment determines whether to delete data in accordance with whether the first process has been completed, thus making it possible to reduce the risk of double transmission or the like of the data.

The second process is not limited to a notification process of a transfer destination, and may be any process related to the first process. For example, the second process may be a process for causing the information processing system 10, another server, a cloud service, or the like to execute a certain process via an API, or may be a combination of a notification process and such processes.

In the data transfer system 1 according to this embodiment, when the transfer status has a value indicating that the information processing system 10 has received a signal indicating successful data transfer from the transfer destination (the cloud storage 4) set in the first process (the data transfer process 155b), data is deleted. Accordingly, only data guaranteed to have been transferred to the transfer destination can be deleted.

FIG. 40 is a diagram illustrating an example communication method between apparatuses.

As illustrated in FIG. 40, apparatuses among the apparatuses illustrated in FIG. 1, namely, the device or apparatus (such as the image forming apparatus 20), the information processing system 10, the cloud storage 4, the administrator terminal 5, and the user terminal 6, communicate with each other in encrypted form. This ensures security. Specifically, after the image forming apparatus 20 in the embodiments described above receives facsimile data from the facsimile 2 via a third-generation (3G) fax line (such as step S301 in FIG. 14), communication between such apparatuses is performed using an encrypted communication method (for example, Hypertext Transfer Protocol Secure (HTTPS)).

For example, the following communication is encrypted using an encryption communication method:

(a) communication between the image forming apparatus 20 and the information processing system 10 in response to receipt of facsimile data, that is, communication for starting connection and performing authentication (such as steps S403 and S405 in FIG. 16), communication performed by the image forming apparatus 20 to acquire the transfer history information 503 or the transfer job execution history information 156 (such as steps S506 to S507 in FIG. 20), and transmission of data such as facsimile data (such as step S408 in FIG. 16);

(b) transfer of data from the information processing system 10 to the cloud storage 4 (such as steps S414 to S415 in FIG. 16);

(c) communication for transfer setting between the administrator terminal 5 and the information processing system 10 or the cloud storage 4 (FIG. 10);

(d) communication from the user terminal 6 to the cloud storage 4 to access transferred facsimile data; and (e) communication between servers or between modules in the information processing system 10 (such as steps S409 to S411 in FIG. 16).

The series of data transfer processes is implemented by a combination of the encrypted communication described above and communication within the image forming apparatus 20, that is, communication between the main body 21 and the operation device 22 using an API (such as step S303 in FIG. 14, step S401 in FIG. 16, and step S510 in FIG. 20).

For example, the operation of the main body 21 in the retransmission process illustrated in FIG. 20 may be performed by the API included in the main body 21. Accordingly, even if communication is performed via an external network such as the Internet during the series of data transfer processes, leakage of data can be prevented as a whole, and security can be improved. To be more specific, with the use of HTTPS as an encrypted communication method, a handshake with the connection destination via transmission control protocol (TCP) communication is performed separately from encryption of the content to be communicated via Secure Sockets Layer (SSL) communication and verification of the connection destination using the mutual certificate in the series of communication activities described above.

In SSL communication, based on the SSL certificate of the connection-destination device, the connection-source device verifies the validity of the certificate and the identity of the host name to verify whether the connection destination is correct. In data transfer across a device (such as the image forming apparatus 20), the information processing system 10, the cloud storage 4, and the like, therefore, it is possible to guarantee the validity of the connection destination and prevent a man-in-the-middle attack in which a malicious third party is placed into the communication path and intercepts communication.

Furthermore, the data transfer system 1 combines some or all of the embodiments described above and the communication methods described above. Accordingly, the data transfer system 1 provides direct communication between a device (the image forming apparatus 20) and the information processing system 10 and between the information processing system 10 and the cloud storage 4 using HTTPS communication including TCP and SSL. In the data transfer system 1, respective data transfer states or processing states are collectively recorded and accumulated in the storage unit 15 of the information processing system 10 as the transfer history information 503 or the transfer job execution history information 156.

This provides traceability of data transfer from the device to the cloud storage via the information processing system 10. The transfer history information 503 or the transfer job execution history information 156 is utilized on the device side, thereby preventing or reducing potential information missing errors such as double transmission, non-transmission, or erroneous deletion of data.

In the information processing system 10, furthermore, to enable the transfer function at the time of initial activation of a device (the image forming apparatus 20) using the application (steps S101 to S110 in FIG. 5), the data is authenticated using the machine identification number (the serial number of the device) after the login of the administrator. In the data transfer system 1, furthermore, the information processing system 10 performs device authentication for each data transfer (steps S401 to S411 in FIG. 16) using encrypted communication. It is therefore possible to prevent tampering or leakage of data transmitted from the device and prevent spoofing from any other device.

Additionally, setting of authentication for access from the information processing system 10 to the cloud storage 4 is performed in advance (step S209 in FIG. 10). In addition, authentication from the device for each data transfer is automatically performed based on the initial registration (such as the device authentication process in step S404 and the license authentication process in step S410 in FIG. 16). As a result, it is possible to improve the convenience of use without causing the user to frequently input authentication information.

As described above, it is possible to achieve (a) concealment of information and a path via encrypted communication, and guarantee of validity of the communication destination, (b) avoidance of loss of transfer data, realization of a safe solution in which tampering and spoofing are suppressed, and (c) improvement of usability.

Further, the information processing system 10 and the image forming apparatus 20 can be configured to share the disclosed processing steps, for example, the processing steps of the sequences disclosed in FIGS. 5, 10, 14, 16, 20 and 26, in various combinations. The components of the information processing system 10 and the image forming apparatus 20 may be integrated into one server apparatus or divided into a plurality of apparatuses.

In the embodiments described above, facsimile data is transferred, for example but not limitation. Embodiments of the present disclosure are applicable to a system that transfers various types of data, such as emails and files. For example, data scanned by the image forming apparatus 20, facsimile data scheduled to be transmitted from the image forming apparatus 20, image data received by the image forming apparatus 20 together with a print instruction, data generated by an application installed in the image forming apparatus 20, or the like may be transferred.

That is, the data to be transferred is not limited to image data and may be data or the like in a file format such as an image file, a text file, a setup file, a document file, a binary data file created by various applications, or a file for holding setting information of an application. Alternatively, the data to be transferred may be data in a format other than a file format.

In addition, a system may be used in which the device has the function of the data transfer unit 11 or the setting registration unit 12 and is configured to transmit or transfer data directly to the cloud storage 4. In this case, the device receives a transfer success signal of the data (similar to that in step S522 illustrated in FIG. 20) from the cloud storage 4 and generates the transfer history information 503. Then, the device may store the generated transfer history information 503 in a storage unit (such as the RAM 223, the flash memory 224, or the storage 214) and compare the transfer history information 503 with accumulated information in the device to perform a retransmission process of the data, a data deletion process, or the like.

Further, the device may directly transfer data to one or more cloud storages 4. For example, as in step S209 illustrated in FIG. 10, the tenant administrator 9 inputs account information, a reference folder, and the like in the cloud storage 4. Then, as in step S520 illustrated in FIG. 20, the device acquires the sort setting information 501 stored in the cloud storage 4 and executes data transfer in accordance with the acquired sort setting information 501.

The cloud storage 4 is an example of a storage configured to store data. The storage may not be a cloud storage, and may be implemented by a single apparatus or a plurality of apparatuses.

When there is a plurality of cloud storages 4 at the transmission destination and the cloud storages 4 have different specifications, the transfer job definition information 155 may be defined for each of the cloud storages 4. Accordingly, in response to completion of transfer of data to any one of the cloud storages 4, the data can be deleted.

Alternatively, the transfer job definition information 155 may be defined to be transmitted to a plurality of cloud storages 4 in a single transfer job. Accordingly, in response to completion of transfer of data to all of the cloud storages 4 included in the single transfer job, the data can be deleted. Alternatively, the transfer job definition information 155 may be defined to be transmitted to the same cloud storage 4 a plurality of times in a single transfer job. For example, the transfer job definition information 155 may be defined to be transmitted to a folder F1 in the cloud storage 4 in the first transmission process and transmitted to be a folder F2 in the cloud storage 4 in the second transmission process. Accordingly, after the completion of a transfer process of data including the backup of the data, the data can be deleted from the transfer source.

The embodiments described above present an example of the data transfer system 1 in which a data deletion process is registered in the queue information 502 and is executed independently of a retransmission process. However, the data transfer system 1 may execute a data deletion process concurrently with a retransmission process. Specifically, when the transfer instruction unit 23 transmits a transfer instruction in step S915 after the processing of step S914 of the retransmission process illustrated in FIG. 35, the data deletion unit 27 executes a data deletion process in an asynchronous manner without waiting for a response to the transfer instruction. Here, the data deletion unit 27 executes the processing of step S1008 illustrated in FIG. 39 and the subsequent processing. Accordingly, the data deletion unit 27 does not execute the processing of steps S1001 to S1007, and the number of times communication with the information processing system 10 is performed can be reduced.

The group of apparatuses described in the embodiments is merely representative of one of a plurality of computing environments for implementing the embodiments disclosed herein. In one embodiment, the information processing system 10 includes a plurality of computing devices such as a server cluster. The plurality of computing devices may be configured to communicate with each other via any type of communication link including a network, a shared memory, and so on, and may perform the processes disclosed herein. Likewise, the image forming apparatus 20 may include a plurality of computing devices configured to communicate with each other.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

In the embodiments described above, the image forming apparatus 20 is presented as an example of a device (apparatus) configured to receive data. However, the device (apparatus) is not limited to an image forming apparatus and may be an apparatus having a communication function. The device may be, for example, a projector (PJ), an output device such as a digital signage, a teleconferencing device, a head up display (HUD) device, an industrial machine, a medical device, a network home appliance, an automobile (connected car), a notebook PC, a mobile phone, a tablet terminal, a game console, a personal digital assistant (PDA), a digital camera, a spherical panoramic image capturing device, a wearable PC, a desktop PC, or the like.

The application program installed in the image forming apparatus 20 may be installed in an information processing apparatus such as a PC, a mobile terminal, or a smartphone of the user. That is, the operation device 22 described above may be included in an apparatus different from the image forming apparatus 20.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

A program according to an embodiment causes a computer to execute a data receiving step of receiving data and storing the received data in a memory, and a transmission instruction step of transmitting data to an information processing system configured to transfer the data to a storage. Specifically, the transmission instruction step includes a step of acquiring transfer history information stored in the information processing system, the transfer history information indicating a transfer state of the data; a step of identifying data to be transmitted from within the data stored in the memory, based on the transfer history information; and a step of transmitting the identified data to the information processing system.

An apparatus according to an embodiment includes a data receiving unit configured to receive data and store the received data in a memory, and a transfer instruction unit configured to transmit data to an information processing system configured to transfer the data to an external storage. The transfer instruction unit identifies data to be transmitted from within the data stored in the memory, and transmits the identified data to the information processing system. The data is identified using an API in response to the data receiving unit receiving the data. Communication for transmitting the data identified using the API to the information processing system is performed via the Internet using an encrypted communication method.

The invention claimed is:
1. An apparatus comprising
circuitry configured to:
store data that is received in a memory;
acquire transfer history information indicating a transfer state of the data, from an information processing system via a network, said information processing system being configured to transfer the data to an external storage;
identify data to be transmitted from within the data stored in the memory, based on the transfer history information received from the information processing system; and
transmit the identified data to the information processing system from the apparatus via the network, wherein the transfer state of the data indicated in the transfer history information includes any one of a status indicating that a transfer process of the data has been accepted, a status indicating that the transfer process of the data is being executed, a status indicating that the transfer process of the data has been completed, and a status indicating that a fault has occurred, and wherein the circuitry is configured to identify data having none of the status indicating that the transfer process of the data has been accepted, the status indicating that the transfer process of the data is being executed, and the status indicating that the transfer process of the data has been completed, as the data to be transmitted from within the data stored in the memory.

2. The apparatus according to claim 1,
wherein the status indicating that the transfer process of the data has been completed indicates that the information processing system has received from the external storage a signal indicating that transfer of the data has succeeded.

3. The apparatus according to claim 2,
wherein the status indicating that the transfer process of the data has been completed is a status indicating that the data has been successfully transferred from the information processing system to the external storage, and wherein the circuitry is configured to acquire the transfer history information from the information processing system, the transfer history information including the status indicating that the transfer process of the data has been completed, and identify data to be transmitted from within the data stored in the memory, based on the transfer history information.

4. The apparatus according to claim 1,
wherein the circuitry is configured to transmit the data stored in the memory to the information processing system and instruct the information processing system to execute a transfer job, the transfer job including a first process for transferring the data, and a second process related to the first process, and wherein the status indicating that the transfer process of the data has been completed is a status indicating that the first process has been completed regardless of whether execution of the second process has been completed.

5. The apparatus according to claim 4,
wherein the circuitry is configured to delete the data from the memory in response to completion of the first process, regardless of whether execution of the second process has been completed, the completion of the first process being indicated by transfer job execution history information indicating a history of execution of the transfer job.

6. The apparatus according to claim 5,
wherein the second process includes a process for notifying a notification destination associated with the data of information related to transfer of the data.

7. The apparatus according to claim 6,
wherein the second process includes a process for transmitting an email to an email address indicating the notification destination.

8. The apparatus according to claim 5,
wherein the transfer job execution history information indicates the completion of the first process in response to the information processing system receiving a signal indicating that transfer of the data has succeeded from a transfer destination set in the first process.

9. The apparatus according to claim 1,
wherein the circuitry is configured to store queue information indicating a queue of processes including a transfer process of the received data and a transmission process of the identified data, and execute the processes registered in the queue information according to an order.

10. The apparatus according to claim 9,
wherein the circuitry is configured to:
acquire the transfer history information indicating the transfer state of the data from the information processing system to execute the transfer process;
determine, based on the transfer history information, whether the data has been subjected to the transmission process; and
execute the transmission process in response to determining that the data has not been subjected to the transmission process.

11. The apparatus according to claim 1,
wherein the circuitry is configured to identify, based on the transfer history information, data not to be subjected to a transmission process from within the data stored in the memory, and delete the identified data from the memory.

12. The apparatus according to claim 1,
wherein communication for transmitting the transfer history information from the information processing system to the apparatus in response to receipt of the data, and communication for transmitting the identified data from the apparatus to the information processing system are performed via the Internet using an encrypted communication method.

13. A data transfer system comprising:
the apparatus according to claim 1; and
the information processing system configured to transfer to the external storage the data transmitted from the apparatus.

14. The apparatus according to claim 1,
wherein the transfer history information indicates the transfer state of the data that is transferred from the information processing system to the external storage, and wherein the circuitry is configured to identify the data to be transmitted based on the transfer state in the transfer history information.

15. The apparatus according to claim 1,
wherein the data includes facsimile data that is transmitted from a facsimile apparatus to the apparatus.

16. A data transfer system comprising:
an apparatus including first circuitry; and
an information processing system including second circuitry,
the first circuitry being configured to:
store data that is received in a memory;
acquire transfer history information indicating a transfer state of the data, from the information processing system via a network;
identify data to be transmitted from within the data stored in the memory, based on the transfer history information received from the information processing system; and
transmit the identified data to the information processing system from the apparatus via the network,
the second circuitry being configured to transfer to an external storage the data transmitted from the apparatus, wherein the transfer state of the data indicated in the transfer history information includes any one of a status indicating that a transfer process of the data has been accepted, a status indicating that the transfer process of the data is being executed, a status indicating that the transfer process of the data has been completed, and a status indicating that a fault has occurred, and wherein the first circuitry is configured to identify data having none of the status indicating that the transfer process of the data has been accepted, the status indicating that the transfer process of the data is being executed. and the status indicating that the transfer process of the data has been completed, as the data to be transmitted from within the data stored in the memory.

17. The data transfer system according to claim 16, wherein communication between the apparatus and the information processing system, and communication between the information processing system and the external storage are performed via the Internet using an encrypted communication method.

18. The data transfer system according to claim 16, wherein the transfer state of the data indicated in the transfer history information stored in the information processing system includes a status indicating that the data has been successfully transferred from the information processing system to the external storage.

19. A data transfer method comprising:

storing data that is received in a memory;

acquiring transfer history information indicating a transfer state of the data, from an information processing system via a network, said information processing system being configured to transfer the data to an external storage;

identifying data to be transmitted from within the data stored in the memory, based on the transfer history information received from the information processing system; and transmitting the identified data to the information processing system from the apparatus via the network, wherein the transfer state of the data indicated in the transfer history information includes any one of a status indicating that a transfer process of the data has been accepted, a status indicating that the transfer process of the data is being executed, a status indicating that the transfer process of the data has been completed. and a status indicating that a fault has occurred, and wherein the method further includes identifying data having none of the status indicating that the transfer process of the data has been accepted, the status indicating that the transfer process of the data is being executed, and the status indicating that the transfer process of the data has been completed, as the data to be transmitted from within the data stored in the memory.

* * * * *